United States Patent
Yavuz et al.

(10) Patent No.: US 8,452,332 B2
(45) Date of Patent: *May 28, 2013

(54) SWITCHING BETWEEN DIFFERENT TRANSMIT/RECEIVE PULSE SHAPING FILTERS FOR LIMITING ADJACENT CHANNEL INTERFERENCE

(75) Inventors: Mehmet Yavuz, San Diego, CA (US); Sanjiv Nanda, Ramona, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/539,385

(22) Filed: Aug. 11, 2009

(65) Prior Publication Data

US 2010/0048221 A1 Feb. 25, 2010

Related U.S. Application Data

(60) Provisional application No. 61/090,569, filed on Aug. 20, 2008.

(51) Int. Cl.
H04B 1/38 (2006.01)
H04B 1/00 (2006.01)

(52) U.S. Cl.
USPC ........................................ 455/561; 455/63.1

(58) Field of Classification Search
USPC .................. 455/436, 435.1, 41.2, 422.1, 561,
455/550.1, 63.1, 444, 452.1, 452.2; 370/331,
370/338, 342, 208
See application file for complete search history.

(56) References Cited

U.S. PATENT DOCUMENTS 7,142,613 B2 11/2006 Beaulieu
2003/0185313 A1 10/2003 Beaulieu (Continued)

FOREIGN PATENT DOCUMENTS

EP 1239640 A1 9/2002
JP 2007166324 A 6/2007

(Continued)

OTHER PUBLICATIONS

Aricent: "Challenges in Deployment of UMTS/HSPA Femtocell", [Online] Feb. 2008, XP002566189 Retrieved from the Internet: URL:http://previ ew-careers.ari cent.com/i n/ whi tepapers/wi reless-and-convergence/femto eel 1-deployment.pdf> [retrieved on Jan. 28, 2010] the whole document.

(Continued)

*Primary Examiner* — Melody Mehrpour
(74) *Attorney, Agent, or Firm* — Florin C. Corie

(57) ABSTRACT

A femtocell base station includes a transmitter that transmits downlink signals to a mobile station, a receiver that receives uplink signals from the mobile station, a standard transmit pulse-shaping filter, and a narrower transmit pulse-shaping filter that limits the bandwidth of the downlink signals to a greater extent than the standard transmit pulse-shaping filter. The femtocell base station also includes a standard receive pulse-shaping filter and a narrower receive pulse-shaping filter. The femtocell base station is configured to switch between the standard transmit pulse-shaping filter and the narrower transmit pulse-shaping filter, and to switch between the standard receive pulse-shaping filter and the narrower receive pulse-shaping filter. A mobile station may switch from a standard transmit pulse-shaping filter to a narrower transmit pulse-shaping filter to limit uplink interference. A mobile station may switch from a narrower transmit pulse-shaping filter to a standard transmit pulse-shaping filter to achieve a higher data rate.

39 Claims, 18 Drawing Sheets

U.S. PATENT DOCUMENTS

| | | | |
|---|---|---|---|
| 2004/0101074 A1 | 5/2004 | Wilson | |
| 2007/0133712 A1 | 6/2007 | Benjebbour et al. | |
| 2008/0013643 A1 | 1/2008 | Lee | |
| 2008/0031377 A1 | 2/2008 | Taylor | |
| 2008/0037411 A1* | 2/2008 | Niemela et al. | 370/208 |
| 2008/0107072 A1 | 5/2008 | Viorel et al. | |
| 2008/0187072 A1 | 8/2008 | Schell et al. | |
| 2008/0304451 A1* | 12/2008 | Thompson | 370/331 |
| 2009/0122771 A1* | 5/2009 | Cai | 370/338 |
| 2009/0135797 A1 | 5/2009 | Zhang et al. | |
| 2009/0310561 A1 | 12/2009 | Grob et al. | |
| 2010/0048215 A1 | 2/2010 | Yavuz et al. | |

FOREIGN PATENT DOCUMENTS

| | | |
|---|---|---|
| JP | 2010536258 A | 11/2010 |
| JP | 2011505759 | 2/2011 |
| KR | 100773745 B1 | 11/2007 |
| WO | 2007125570 A1 | 11/2007 |
| WO | WO2007126351 | 11/2007 |
| WO | WO2009020975 | 2/2009 |
| WO | WO2009070602 | 6/2009 |
| WO | WO2009076274 A2 | 6/2009 |

OTHER PUBLICATIONS

International Search Report and Written Opinion—PCT/US2009/054547, International Search Authority—European Patent Office—Feb. 17, 2010.

International Search Report and Written Opinion PCT/US09/059734 International Search Authority European Patent Office Apr. 27, 2010.

Humblet, P., et al., "System design of CDMA2000 femtoceils", IEEE Communications Magazine, Sep. 1, 2009, pp. 92-100, vol. 47, No. 9, IEEE Service Center, Piscataway, US, XP011283370, ISSN 0163-6804, LNKDDOI: 10.1109/MCOM.2009.5277461, p. 97,98 Preferred User Zone List, Dual Mode Mobile issues.

* cited by examiner

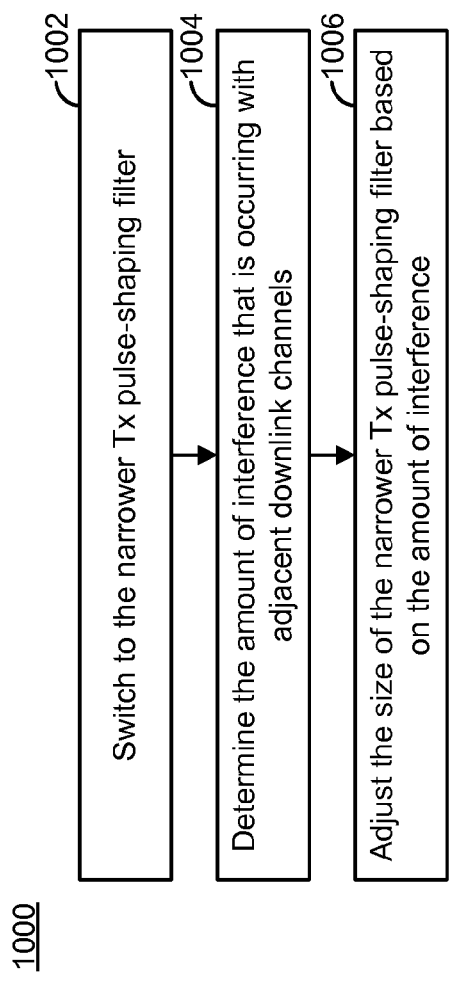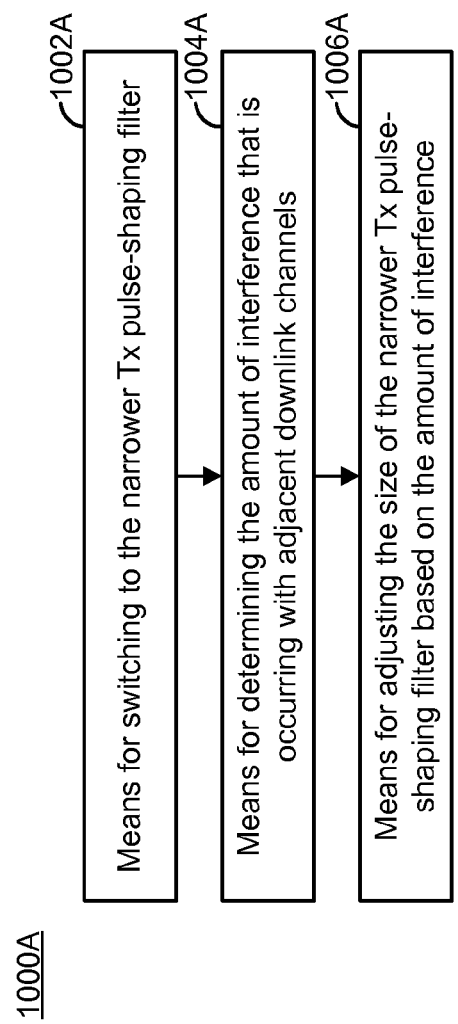

SWITCHING BETWEEN DIFFERENT TRANSMIT/RECEIVE PULSE SHAPING FILTERS FOR LIMITING ADJACENT CHANNEL INTERFERENCE

RELATED APPLICATIONS

This application is related to and claims priority from U.S. Patent Application Ser. No. 61/090,569, filed Aug. 20, 2008, for "Adaptive Transmission (Tx)/Reception (Rx) Pulse Shaping Filter For Access Point Base Stations And Mobile Stations Within A Network," which is incorporated herein by reference.

TECHNICAL FIELD

The present disclosure relates generally to communication systems. More specifically, the present disclosure relates to an adaptive transmission (Tx)/reception (Rx) pulse shaping filter for femtocell base stations and mobile stations within a network.

BACKGROUND

Wireless communication systems have become an important means by which many people worldwide have come to communicate. A wireless communication system may provide communication for a number of mobile stations, each of which may be serviced by a base station.

As used herein, the term "mobile station" refers to an electronic device that may be used for voice and/or data communication over a wireless communication system. Examples of mobile stations include cellular phones, personal digital assistants (PDAs), wireless modems, laptop computers, etc. A mobile station may alternatively be referred to as an access terminal, a mobile terminal, a subscriber station, a remote station, a user terminal, a terminal, a subscriber unit, a mobile device, a wireless device, user equipment, or some other terminology.

The term "base station" refers to a wireless communication station that is installed at a fixed location and used to communicate with mobile stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

A femtocell base station is a small cellular base station, typically designed for use in residential or small business environments. It connects to the service provider's network via broadband (such as DSL or cable). A femtocell base station allows service providers to extend service coverage indoors, especially where access would otherwise be limited or unavailable. A femtocell base station may alternatively be referred to as an access point base station, a Home Node B (HNB), Home evolved Node B (HeNB), femto node, etc.

The coverage area of a femtocell base station may be referred to herein as a femtocell. The coverage area of a typical base station may be referred to herein as a macrocell, and a typical base station may be referred to herein as a macrocell base station.

Adjacent channel interference is interference caused by extraneous power from a signal in an adjacent channel. Adjacent channel interference may occur between two mobile stations, where one of the mobile stations is receiving service from a femtocell base station and the other mobile station is receiving service from a macrocell base station, and where the two mobile stations are operating at adjacent carriers. The present disclosure relates to reducing adjacent channel interference, particularly where the interfering channels involve a femtocell base station and a macrocell base station.

BRIEF DESCRIPTION OF THE DRAWINGS

FIG. 10 illustrates another method for limiting adjacent channel interference;

FIG. 10A illustrates means-plus-function blocks corresponding to the method of FIG. 10;

DETAILED DESCRIPTION

Figure 1:
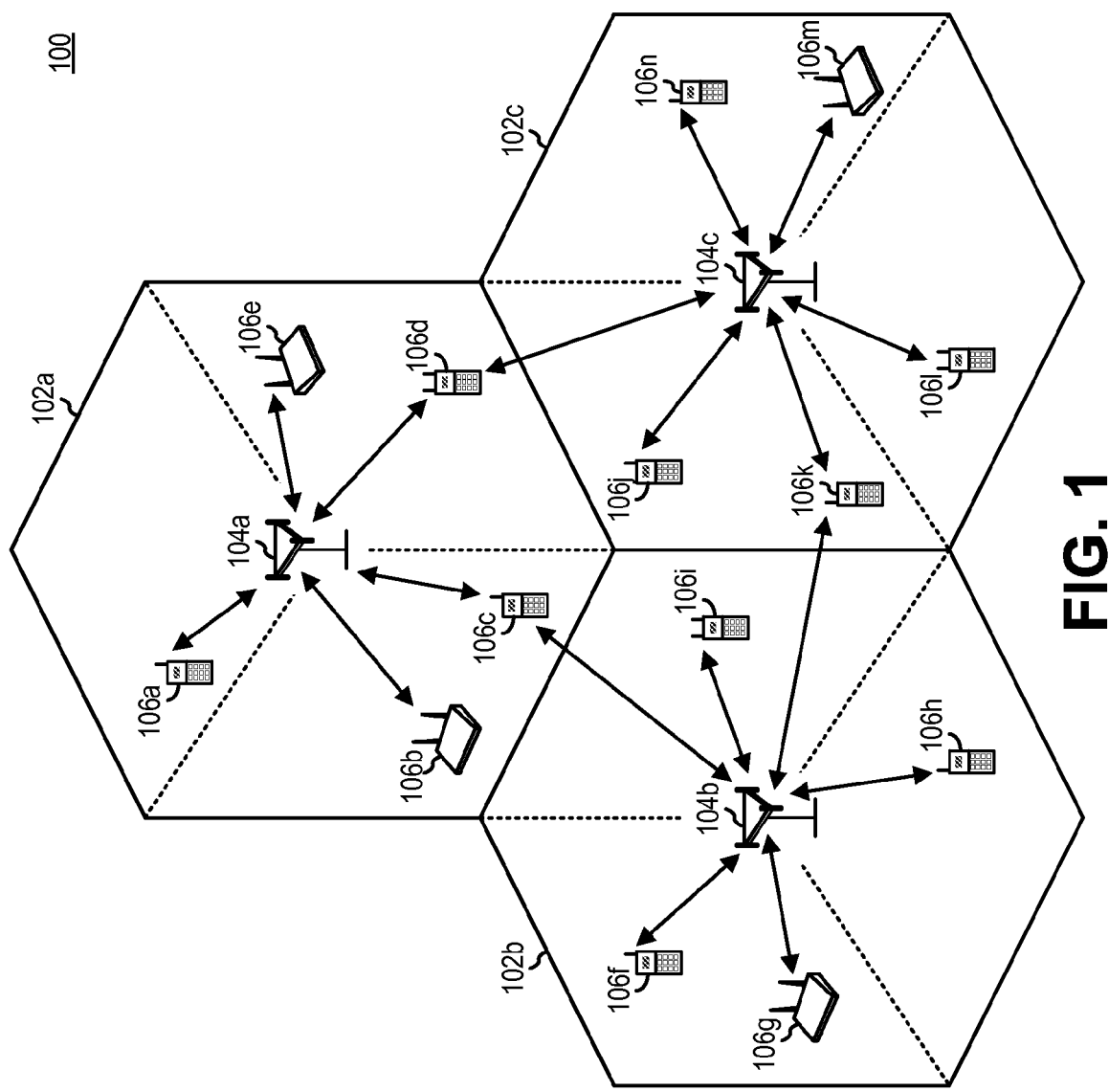
FIG. 1 illustrates a wireless communication system that is configured to support a number of users.

A femtocell base station that is configured for limiting adjacent channel interference is disclosed. The femtocell base station includes a transmitter that is configured to transmit downlink signals to a mobile station. The femtocell base station also includes a transmit pulse-shaping filter that limits bandwidth of the downlink signals transmitted by the femtocell base station. The femtocell base station also includes a narrower transmit pulse-shaping filter that limits the bandwidth of the downlink signals transmitted by the femtocell base station to a greater extent than the transmit pulse-shaping filter. The femtocell base station also includes a processor. The femtocell base station also includes memory in electronic communication with the processor. The femtocell base station further includes instructions stored in the memory. The instructions are executable by the processor to cause the femtocell base station to switch between the transmit pulse-shaping filter and the narrower transmit pulse-shaping filter.

The instructions may be executable by the processor to cause the femtocell base station to switch from the transmit pulse-shaping filter to the narrower transmit pulse-shaping filter in response to determining that an adjacent channel is being used. The bandwidth of the narrower transmit pulse-shaping filter may depend on the amount of interference that is occurring. The instructions may also be executable by the processor to cause the femtocell base station to switch from the transmit pulse-shaping filter to the narrower transmit pulse-shaping filter in response to determining that the femtocell base station is not currently providing service to any mobile stations. The instructions may also be executable by the processor to cause the femtocell base station to switch from the narrower transmit pulse-shaping filter to the transmit pulse-shaping filter in response to determining that a data rate condition is satisfied.

The instructions may also be executable by the processor to cause the femtocell base station to determine whether to use the transmit pulse-shaping filter or the narrower transmit pulse-shaping filter in response to detecting that the mobile station is a legacy mobile station. The instructions may also executable by the processor to cause the femtocell base station to provide at least one command to the mobile station about which receive pulse-shaping filter to use based on whether the transmit pulse-shaping filter or the narrower transmit pulse-shaping filter is being used at the femtocell base station.

The femtocell base station may also include a receiver for receiving uplink signals from the mobile station. The femtocell base station may also include a receive pulse-shaping filter that matches a transmit pulse-shaping filter at the mobile station. The femtocell base station may further include a narrower receive pulse-shaping filter that matches a narrower transmit pulse-shaping filter at the mobile station. The instructions may also be executable by the processor to cause the femtocell base station to switch between the receive pulse-shaping filter and the narrower receive pulse-shaping filter.

The instructions may also be executable by the processor to cause the femtocell base station to switch between the receive pulse-shaping filter and the narrower receive pulse-shaping filter based on at least one command received from the mobile station. The instructions may also be executable by the processor to cause the femtocell base station to provide at least one command to the mobile station to switch to a narrower transmit pulse-shaping filter in response to detecting that uplink transmissions of the mobile station interfere with uplink transmissions of another mobile station. The instructions may further be executable by the processor to cause the femtocell base station to provide at least one command to the mobile station to switch from the narrower transmit pulse-shaping filter to the transmit pulse-shaping filter in response to a data rate condition being satisfied.

A method for limiting adjacent channel interference is disclosed. The method is implemented by a femtocell base station. The method includes transmitting downlink signals to a mobile station. The method also includes switching between a transmit pulse-shaping filter and a narrower transmit pulse-shaping filter. The transmit pulse-shaping filter limits bandwidth of the downlink signals transmitted by the femtocell base station, and the narrower transmit pulse-shaping filter limits the bandwidth of the downlink signals transmitted by the femtocell station to a greater extent than the transmit pulse-shaping filter.

A femtocell base station that is configured for limiting adjacent channel interference is disclosed. The femtocell base station includes means for transmitting downlink signals to a mobile station. The femtocell base station also includes means for switching between a transmit pulse-shaping filter and a narrower transmit pulse-shaping filter. The transmit pulse-shaping filter limits bandwidth of the downlink signals transmitted by the femtocell base station. The narrower transmit pulse-shaping filter limits the bandwidth of the downlink signals transmitted by the femtocell station to a greater extent than the transmit pulse-shaping filter.

A computer-program product for a femtocell base station that is configured to limit adjacent channel interference is disclosed. The computer-program product includes a computer-readable medium having instructions thereon. The instructions include code for transmitting downlink signals to a mobile station. The instructions also include code for switching between a transmit pulse-shaping filter and a narrower transmit pulse-shaping filter. The transmit pulse-shaping filter limits bandwidth of the downlink signals transmitted by the femtocell base station. The narrower transmit pulse-shaping filter limits the bandwidth of the downlink signals transmitted by the femtocell station to a greater extent than the transmit pulse-shaping filter.

A mobile station that is configured for limiting adjacent channel interference is disclosed. The mobile station includes a transmitter that is configured to transmit uplink signals to a femtocell base station. The mobile station also includes a transmit pulse-shaping filter. The mobile station also includes a narrower transmit pulse-shaping filter. The narrower transmit pulse-shaping filter limits bandwidth of uplink signals transmitted by the mobile station to a greater extent than the transmit pulse-shaping filter. The mobile station also include a processor and memory in electronic communication with the processor. The mobile station further includes instructions stored in the memory. The instructions are executable by the processor to cause the mobile station to switch between the transmit pulse-shaping filter and the narrower transmit pulse-shaping filter based on commands received from the femtocell base station.

A mobile station that is configured for limiting adjacent channel interference is disclosed. The mobile station includes a transmitter that is configured to transmit uplink signals to a femtocell base station. The mobile station also includes a transmit pulse-shaping filter. The mobile station also includes a narrower transmit pulse-shaping filter. The narrower transmit pulse-shaping filter limits bandwidth of uplink signals transmitted by the mobile station to a greater extent than the transmit pulse-shaping filter. The mobile station also includes a processor. The mobile station also includes memory in electronic communication with the processor. The mobile station also includes instructions stored in the memory. The instructions are executable by the processor to cause the mobile station to switch from the narrower transmit pulse-shaping filter to the transmit pulse-shaping filter in response to determining that a data rate condition is satisfied.

The instructions may also be executable by the processor to cause the mobile station to request permission from the femtocell base station to switch from the narrower transmit pulse-shaping filter to the transmit pulse-shaping filter in response to determining that the data rate condition is satisfied.

FIG. 1 illustrates a wireless communication system 100 that is configured to support a number of users. The system 100 provides communication for multiple macrocells 102 (e.g., macrocells 102a-a), with each macrocell 102 being serviced by a corresponding macrocell base station (BS) 104 (e.g., macrocell BSs 104a-a). Mobile stations 106 (e.g., mobile stations 106a-n) may be dispersed at various locations throughout the system 100 over time. Each mobile station (MS) 106 may communicate with one or more macrocell base stations 104 on an uplink and/or a downlink at a given moment, depending upon whether the MS 106 is active and whether it is in soft handoff, for example. The wireless communication system 100 may provide service over a large geographic region.

Figure 2:
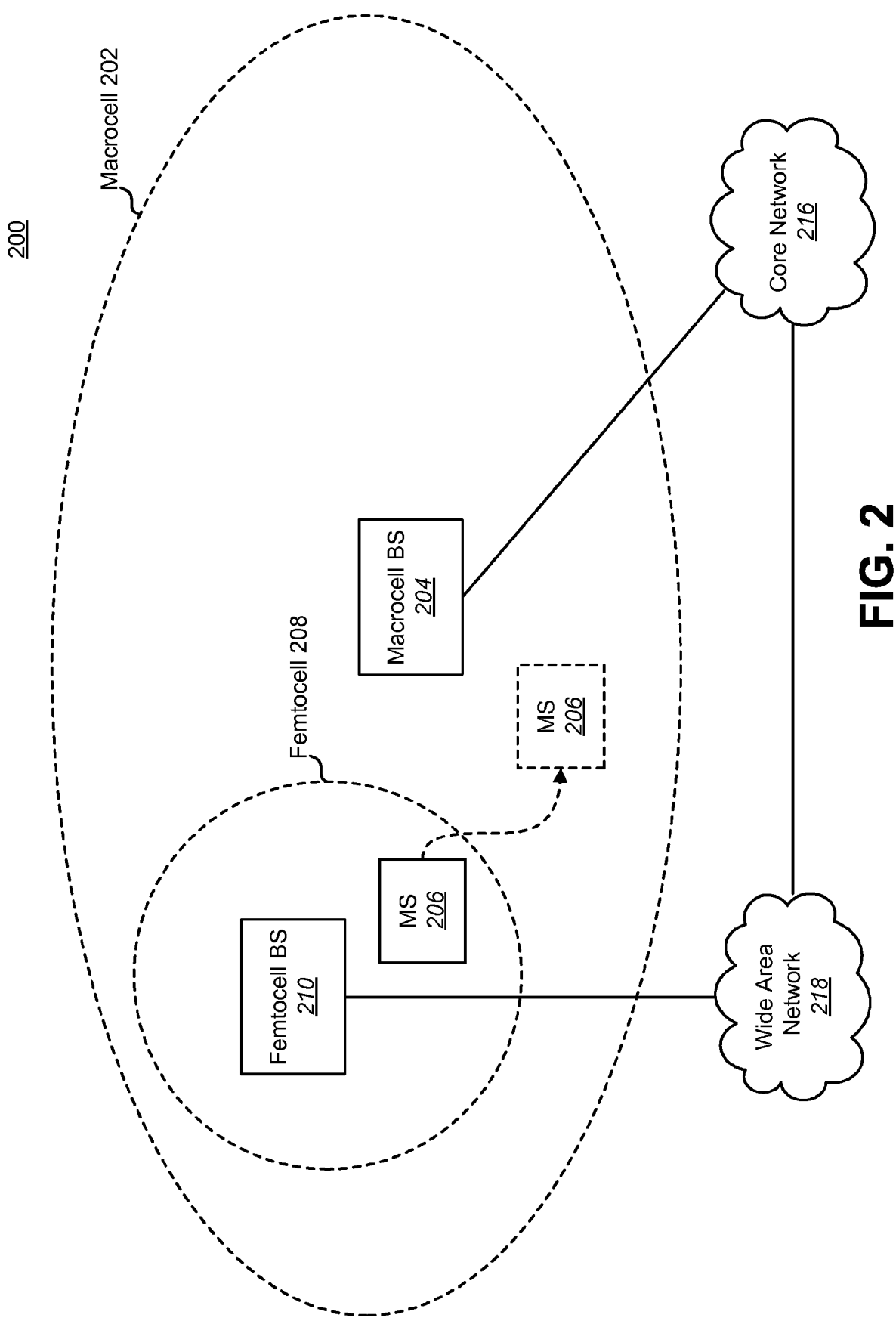
FIG. 2 illustrates a wireless communication system that includes a femtocell base station and a macrocell base station.

FIG. 2 illustrates a wireless communication system 200 that includes a femtocell BS 210 and a macrocell BS 204. The coverage area of the femtocell BS 210 may be referred to herein as a femtocell 208, while the coverage area of the macrocell BS 204 may be referred to herein as a macrocell 202. The macrocell 202 may be considerably larger than the femtocell 208. For example, the radius of the macrocell 202 may be on the order of several kilometers, whereas the femtocell 208 may cover a home or a small building. The femtocell 208 may be thought of as a small, isolated coverage area located within the macrocell 202.

The femtocell BS 210 may be coupled to a wide area network 218 (e.g., the Internet) and a mobile operator core network 216 via a DSL router, a cable modem, a wireless link, or other connectivity means. The macrocell BS 204 may also be coupled to the core network 216.

The MS 206 may be capable of receiving service from the femtocell BS 210, and it also may be capable of receiving service from the macrocell BS 204. For example, the femtocell BS 210 may provide service to the MS 206 when the MS 206 is located within the femtocell 208. When the MS 206 moves outside of the femtocell 208 but is still located within the macrocell 202, the macrocell BS 204 may provide service to the MS 206. In this context, the term "service" refers to an active call state, and may be a voice call and/or a data call.

Figure 3:
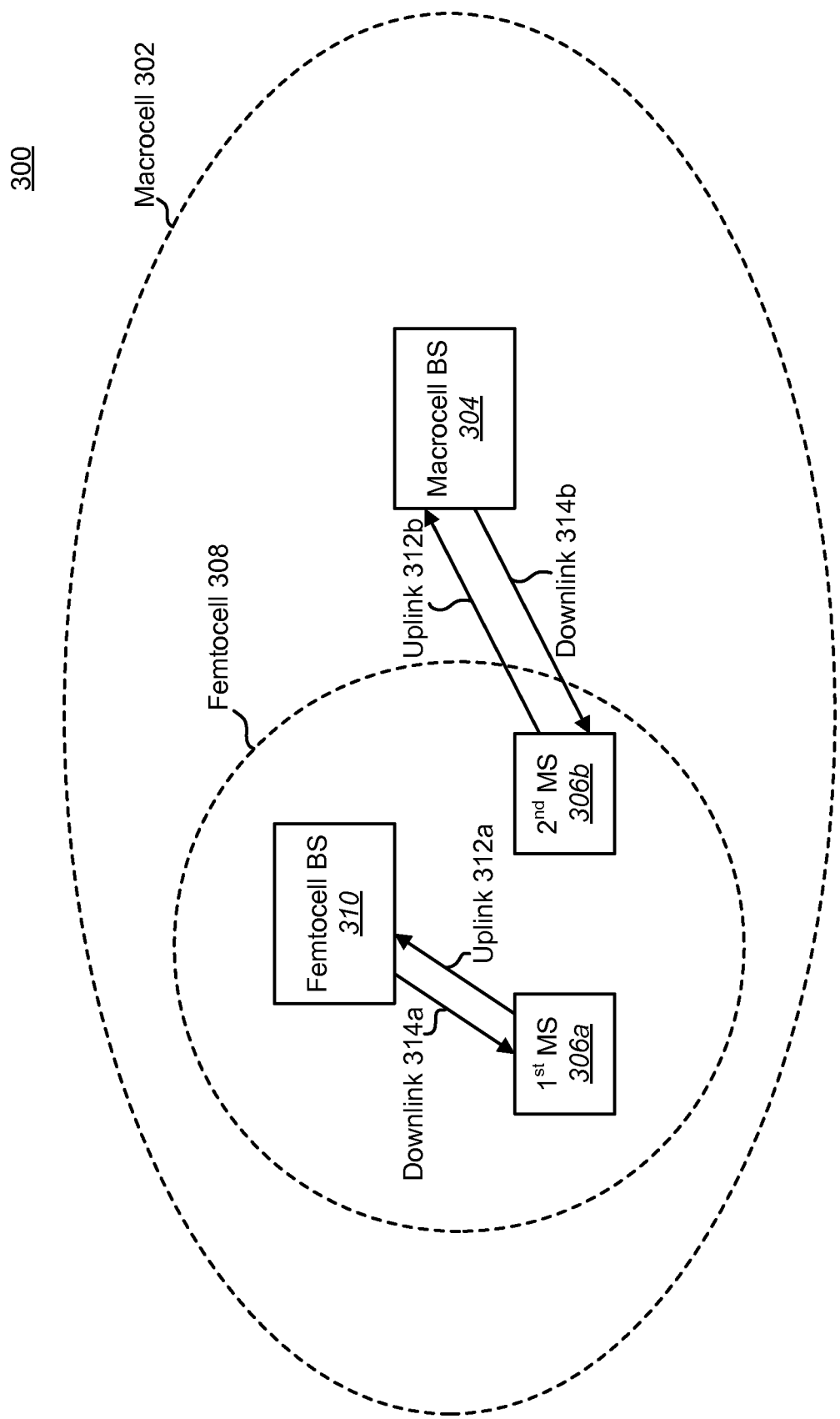
FIG. 3 illustrates a wireless communication system that includes a first mobile station and a second mobile station, in which adjacent channel interference may occur.

FIG. 3 illustrates a wireless communication system 300 in which a first MS 306a and a second MS 306b are located within a femtocell 308 that is located within a macrocell 302. The first MS 306a is receiving service from a femtocell BS 310. The first MS 306a sends data to the femtocell BS 310 via an uplink 312a, and receives data from the femtocell BS 310 via a downlink 314a. However, even though the second MS 306b is located within the femtocell 308, the second MS 306b is receiving service from a macrocell BS 304. For example, the femtocell BS 310 may be located within a person's home, and the second MS 306b may belong to someone who is visiting the person's home but who is not authorized to receive service from the femtocell BS 310. The second MS 306b sends data to the macrocell BS 304 via an uplink 312b, and receives data from the macrocell BS 304 via a downlink 314b.

The second MS 306b may be located relatively close to the femtocell BS 310. As a result, transmissions from the second MS 306b to the macrocell BS 304 on the uplink 312b may be received at the femtocell BS 310, and may therefore interfere with transmissions from the first MS 306a to the femtocell BS 310 on the uplink 312a. Similarly, transmissions from the first MS 306a to the femtocell BS 310 on the uplink 312a may be received at the macrocell BS 304, and may interfere with transmissions from the second MS 306b to the macrocell BS 304 on the uplink 312b. If adjacent carriers are used for a channel on the uplink 312a and a channel on the uplink 312b, then this interference may be referred to as adjacent uplink channel interference.

Similarly, transmissions from the femtocell BS 310 to the first MS 306a on the downlink 314a may be received at the second MS 306b, and may therefore interfere with transmissions from the macrocell BS 304 to the second MS 306b on the downlink 314b. If adjacent carriers are used for a channel on the downlink 314a and a channel on the downlink 314b, then this interference may be referred to as adjacent downlink channel interference.

Although in FIG. 3 the second MS 306b is located within the femtocell 308, adjacent uplink channel interference and adjacent downlink channel interference may occur even if the second MS 306b is located outside of the femtocell 308. The methods disclosed herein may be utilized whether the second MS 306b is located inside or outside of the femtocell 308.

Figure 4:
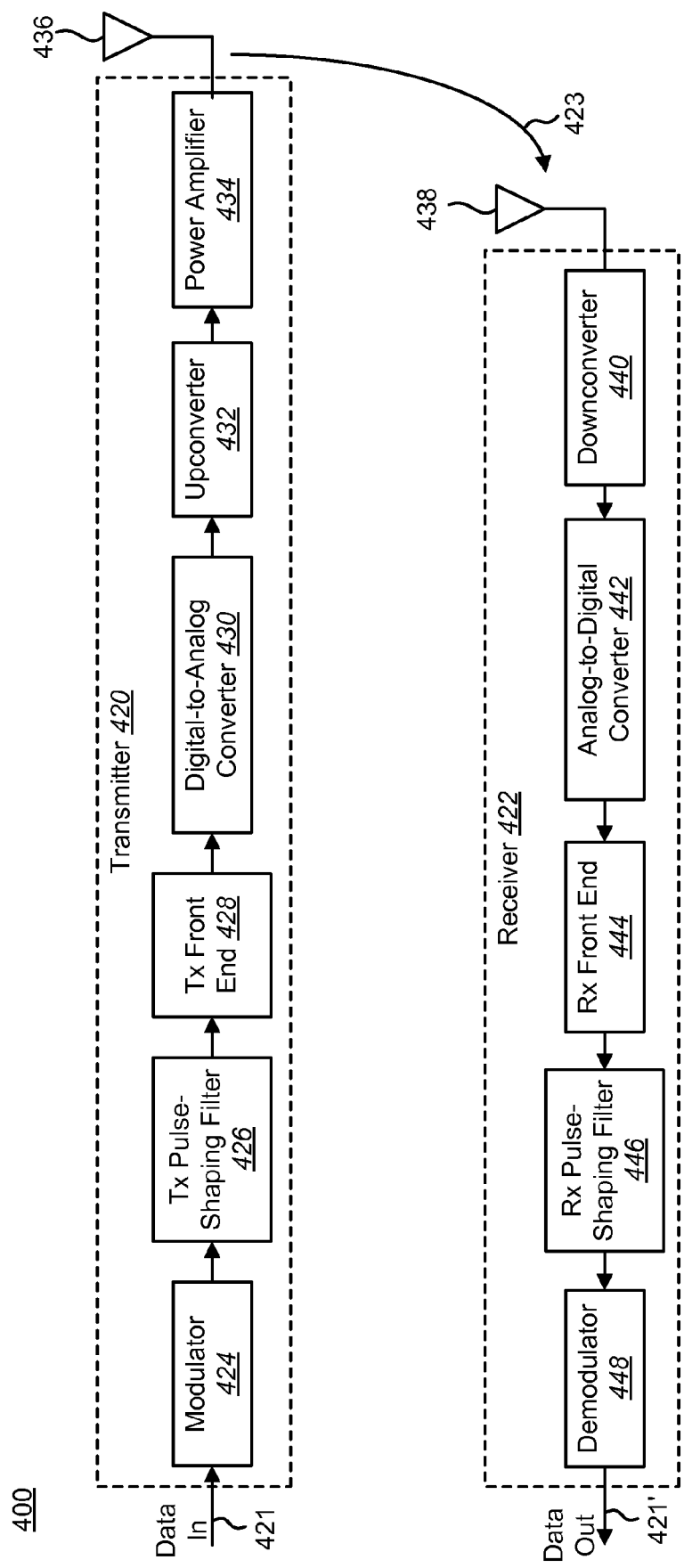
FIG. 4 illustrates a transmitter and a receiver in a wireless communication system.

FIG. 4 illustrates a transmitter 420 and a receiver 422 in a wireless communication system 400. The transmitter 420 and the receiver 422 may be implemented within a femtocell BS 310, a macrocell BS 304, an MS 306, etc.

The transmitter 420 accepts digital data 421, converts it to a modulated radio frequency (RF) signal 423, and transmits the signal 423 to the receiver 422. The receiver 422 receives the RF signal 423 and demodulates it so as to output data 421' that is a reproduction of the data 421.

The digital data 421 provided to the transmitter 420 may be modulated by a modulator 424 to produce a sequence of modulated samples that represent symbols, in accordance with a certain modulation format. The modulated samples may be filtered by a transmitter (Tx) pulse-shaping filter 426 to produce a sequence of filtered samples. The Tx pulse-shaping filter 426 is a digital filter, which may be implemented as a finite impulse response (FIR) filter.

A Tx front end 428 may process the output of the Tx pulse-shaping filter 426. The Tx front end 428 may perform functions such as interpolation, predistortion and/or other filtering operations. The filtered samples may be provided to a digital-to-analog converter (DAC) 430, which produces an analog signal representing the modulated and filtered sample sequence at its input. The analog signal may then be upconverted to a suitable radio frequency by an upconverter (UC) 432 and amplified by a power amplifier (PA) 434. The RF signal 423 may then be transmitted via a transmit antenna 436.

A receive antenna 438 may receive the transmitted signal 423 and provide it to a downconverter 440, which downconverts the signal 423 from RF to a suitable intermediate frequency (IF) or baseband analog signal. The analog signal may be digitized by an analog-to-digital converter (ADC) 442, which produces a sequence of digitized samples. The digitized samples may be processed by a receiver (Rx) front end 444, which may perform functions such as decimation, automatic gain control (AGC) and/or other adaptive filtering operations. The samples may then be filtered by an Rx pulse-shaping filter 446. The Rx pulse-shaping filter 446 is a digital filter, which may be implemented as an FIR filter. The samples at the output of the Rx pulse-shaping filter 446 may be demodulated by a demodulator 448, which outputs data 421' that is ideally a reproduction of the data 421 provided to the transmitter 420.

The spectral responses of the Tx pulse-shaping filter 426 and the Rx pulse-shaping filter 446 may have a significant influence on the performance of the communication system 400. For example, the Tx pulse-shaping filter 426 limits the spectral bandwidth of the transmitted signal 423, often determining the level of adjacent channel interference and other spurious emissions generated by the transmitter 420. When the transmitter 420 conforms to a particular communication standard, the bandwidth of the transmitted signal 423 is typically specified in the standard, often using a spectral mask, which should not be exceeded.

The Tx pulse-shaping filter 426 and the Rx pulse-shaping filter 446 should be matched to one another. For example, the Tx pulse-shaping filter 426 and the Rx pulse-shaping filter 446 may be implemented so that they each have a root raised cosine (RRC) response, and so that their combined spectral response is a raised cosine (RC) spectral response. Of course, RRC is provided as an example only; the Tx pulse-shaping filter 426 and the Rx pulse-shaping filter 446 do not have to be implemented so that they each have an RRC response. However, they should have the same response such that the Rx pulse-shaping filter 446 is matched to the Tx pulse-shaping filter 426, so as to maximize the signal-to-noise ratio (SNR).

Figure 5:
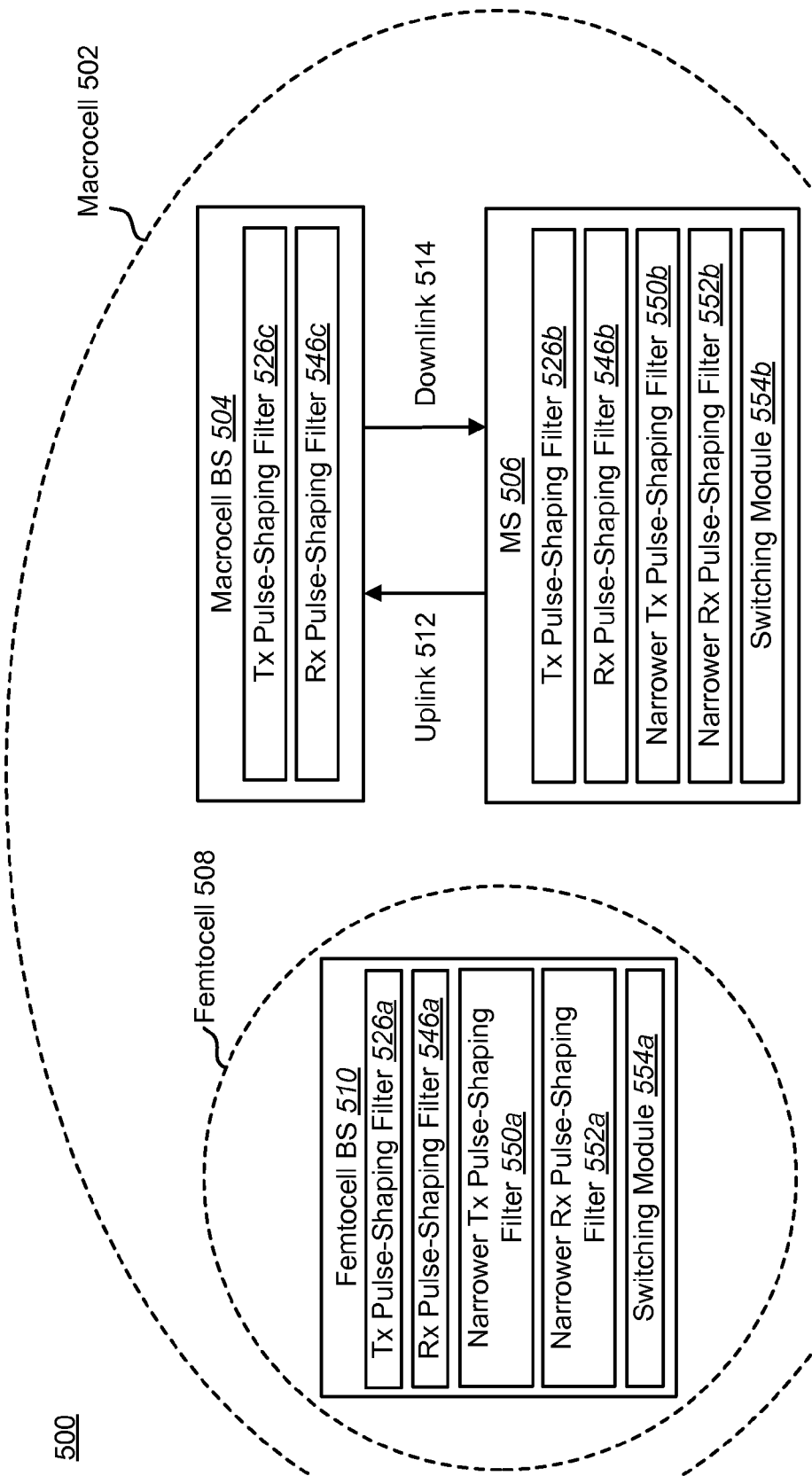
FIG. 5 illustrates a wireless communication system that is configured for limiting adjacent channel interference.

FIG. 5 illustrates a wireless communication system 500 that is configured for limiting adjacent channel interference. The system 500 includes a femtocell BS 510 and a macrocell BS 504. The coverage area of the femtocell BS 510 may be referred to as a femtocell 508, while the coverage area of the macrocell BS 504 may be referred to as a macrocell 502. The femtocell 508 is located within the macrocell 502.

The femtocell BS 510 includes a standard Tx pulse-shaping filter 526a, a standard Rx pulse-shaping filter 546a, a narrower Tx pulse-shaping filter 550a, a narrower Rx pulse-shaping filter 552a, and a switching module 554a. The MS 506 includes a standard Tx pulse-shaping filter 526b, a standard Rx pulse-shaping filter 546b, a narrower Tx pulse-shaping filter 550b, a narrower Rx pulse-shaping filter 552b, and a switching module 554b. The macrocell BS 504 includes a standard Tx pulse-shaping filter 526c and a standard Rx pulse-shaping filter 546c.

The femtocell BS 510 is capable of operating in at least two different configurations. In a first configuration, the femtocell BS 510 utilizes the narrower Tx pulse-shaping filter 550a and the narrower Rx pulse-shaping filter 552a. In a second configuration, the femtocell BS 510 utilizes the standard Tx pulse-shaping filter 526a and the standard Rx pulse-shaping filter 546a.

The femtocell BS 510 may also be capable of operating in more than two configurations. For example, the femtocell BS 510 may be capable of operating in a configuration where it uses the narrower Tx pulse-shaping filter 550a and the standard Rx pulse-shaping filter 546a. Also, the femtocell BS 510 may be capable of operating in a configuration where it uses the standard Tx pulse-shaping filter 526a and the narrower Rx pulse-shaping filter 552a. The switching module 554a is configured to switch between the various possible configurations of the femtocell BS 510.

Similarly, the MS 506 is capable of operating in at least two different configurations. In a first configuration, the MS 506 utilizes the narrower Tx pulse-shaping filter 550b and the narrower Rx pulse-shaping filter 552b. In a second configuration, the MS 506 utilizes the standard Tx pulse-shaping filter 526b and the standard Rx pulse-shaping filter 546b. The MS 506 may also be capable of operating in a configuration where it uses the narrower Tx pulse-shaping filter 550b and the standard Rx pulse-shaping filter 546b. Also, the MS 506 may be capable of operating in a configuration where it uses the standard Tx pulse-shaping filter 526b and the narrower Rx pulse-shaping filter 552b. The switching module 554b is configured to switch between the various possible configurations of the MS 506.

As used herein, the terms "standard" and "narrower" are relative terms. A narrower Tx pulse-shaping filter (e.g., the narrower Tx pulse-shaping filter 550a utilized by the femtocell BS 510 or the narrower Tx pulse-shaping filter 550b utilized by the MS 506) limits the spectral bandwidth of transmitted signals to a greater extent than a standard Tx pulse-shaping filter (e.g., the standard Tx pulse-shaping filter 526a utilized by the femtocell BS 510 or the standard Tx pulse-shaping filter 526b utilized by the MS 506). For example, in one possible implementation, the 3 dB bandwidth of a narrower Tx pulse-shaping filter is 90% of the 3 dB bandwidth of a standard Tx pulse-shaping filter. However, this value is provided for purposes of example only, and should not be used to limit the scope of the present disclosure.

The standard Rx pulse-shaping filter 546b at the MS 506 is matched to the standard Tx pulse-shaping filter 526a at the femtocell BS 510 and the standard Tx pulse-shaping filter 526c at the macrocell BS 504. The narrower Rx pulse-shaping filter 552b at the MS 506 is matched to the narrower Tx pulse-shaping filter 550a at the femtocell BS 510. The standard Rx pulse-shaping filter 546a at the femtocell BS 510 is matched to the standard Tx pulse-shaping filter 526b at the MS 506. The narrower Rx pulse-shaping filter 552a at the femtocell BS 510 is matched to the narrower Tx pulse-shaping filter 550b at the MS 506. The standard Rx pulse-shaping filter 546c at the macrocell BS 504 is matched to the standard Tx pulse-shaping filter 526b at the MS 506.

The MS 506 is capable of receiving service from the femtocell BS 510 when the MS 506 is located within the femtocell 508. The MS 506 is also capable of receiving service from the macrocell BS 504 when the MS 506 is located outside of the femtocell 508 but still within the macrocell 502. In FIG. 5, the MS 506 is shown located outside of the femtocell 508 but still within the macrocell 502. Thus, the MS 506 is receiving service from the macrocell BS 504. Transmissions from the MS 506 to the macrocell BS 504 occur via an uplink 512, and transmissions from the macrocell BS 504 to the MS 506 occur via a downlink 514. When the MS 506 is receiving service from the macrocell BS 504, the MS 506 utilizes the standard Tx pulse-shaping filter 526b and the standard Rx pulse-shaping filter 546b.

There are not any MSs in the femtocell 508, and therefore the femtocell BS 510 is not providing service to any MSs. The switching module 554a is configured so that in this situation (where the femtocell BS 510 is not providing service to any MSs), the femtocell BS 510 utilizes the narrower Tx pulse-shaping filter 550a and the narrower Rx pulse-shaping filter 552a. Even though the femtocell BS 510 is not providing service to any MSs, the femtocell BS 510 transmits a pilot channel and overhead channels. The use of the narrower Tx pulse-shaping filter 550a reduces the amount of adjacent channel interference caused by the transmission of the pilot channel and the overhead channels (e.g., the extent to which the pilot and overhead channels interfere with transmissions on the downlink 514 from the macrocell BS 504 to the MS 506). If the femtocell BS 510 is currently using the standard Tx pulse-shaping filter 526a and the standard Rx pulse-shaping filter 546a when it determines that it is not currently providing service to any MSs, then the switching module 554a is configured to switch to the narrower Tx pulse-shaping filter 550a and the narrower Rx pulse-shaping filter 552a.

Alternatively, the switching module 554a may be configured so that the femtocell BS 510 utilizes the narrower Tx pulse-shaping filter 550a and the standard Rx pulse-shaping filter 546a, or vice versa.

Figure 6:
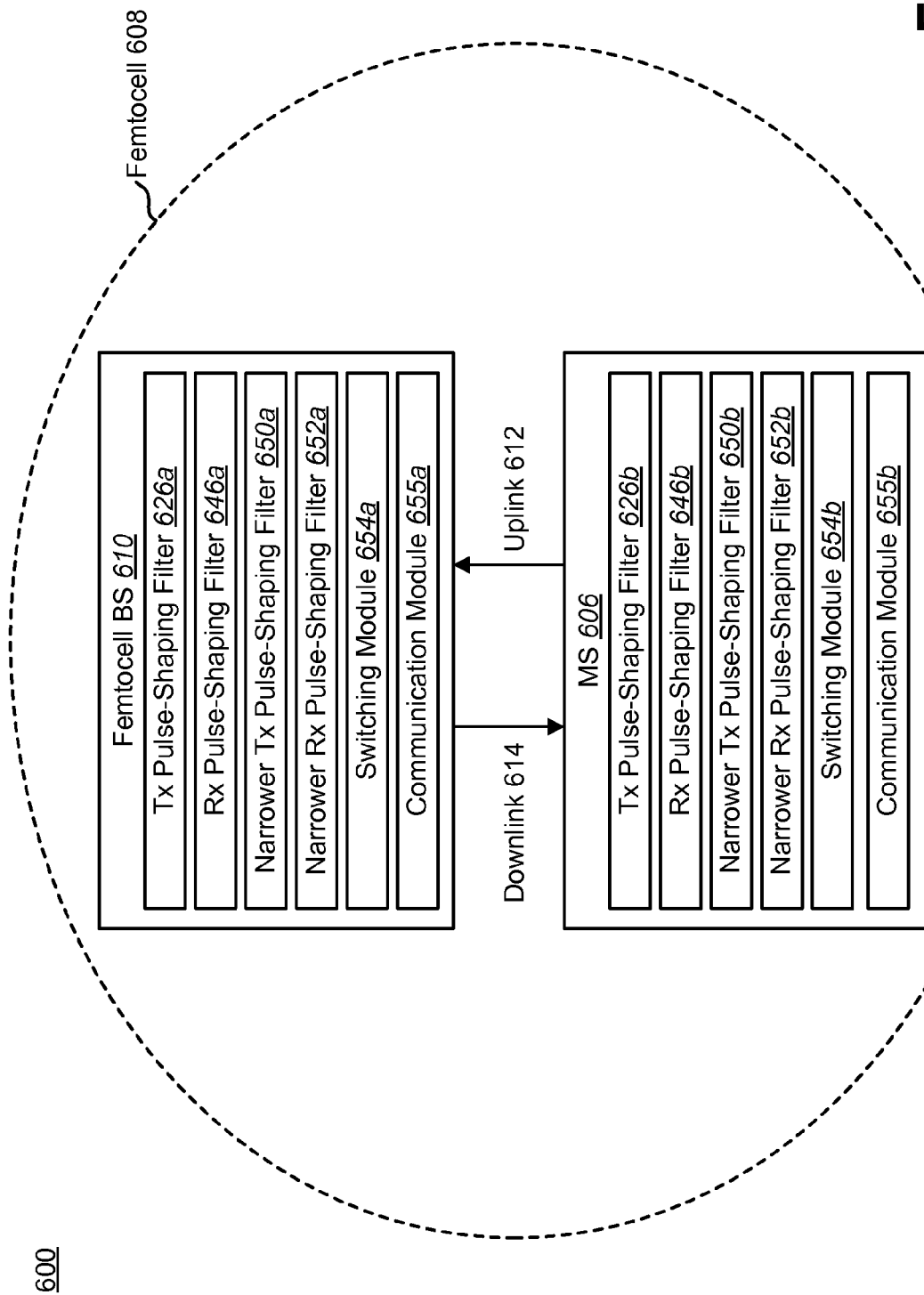
FIG. 6 illustrates another wireless communication system that is configured for limiting adjacent channel interference.

FIG. 6 illustrates another wireless communication system 600 that is configured for limiting adjacent channel interference. An MS 606 is located within a femtocell 608. The MS 606 is receiving service from the femtocell 610. Transmissions from the MS 606 to the femtocell BS 610 occur via an uplink 612, and transmissions from the femtocell BS 610 to the MS 606 occur via a downlink 614.

A switching module 654a at the femtocell BS 610 is configured to switch between a narrower Tx pulse-shaping filter 650a and a standard Tx pulse-shaping filter 626a based on whichever Tx pulse-shaping filter would be most appropriate under the circumstances. Examples will be provided below. A communication module 655a at the femtocell BS 610 is configured to provide commands to the MS 606 about which Rx pulse-shaping filter to use (e.g., whether to use a standard Rx pulse-shaping filter 646b or a narrower Rx pulse-shaping filter 652b) based on whether the standard Tx pulse-shaping filter 626a or the narrower Tx pulse-shaping filter 650a is being used at the femtocell base station 610. A switching module 654b at the MS 606 is configured to switch to the appropriate Rx pulse-shaping filter based on the commands received from the femtocell BS 610.

In a similar manner, a switching module 654b at the MS 606 is configured to switch between a narrower Tx pulse-shaping filter 650b and a standard Tx pulse-shaping filter 626b based on whichever Tx pulse-shaping filter would be most appropriate under the circumstances. A communication module 655b at the MS 606 is configured to provide commands to the femtocell BS 610 about which Rx pulse-shaping filter to use (e.g., whether to use a standard Rx pulse-shaping filter 646a or a narrower Rx pulse-shaping filter 652a) based on whether the standard Tx pulse-shaping filter 626b or the narrower Tx pulse-shaping filter 650b is being used at the MS 606. Alternatively, the femtocell BS 610 may provide commands to the MS 606 about which Tx pulse-shaping filter to use on the uplink 612.

Figure 7:
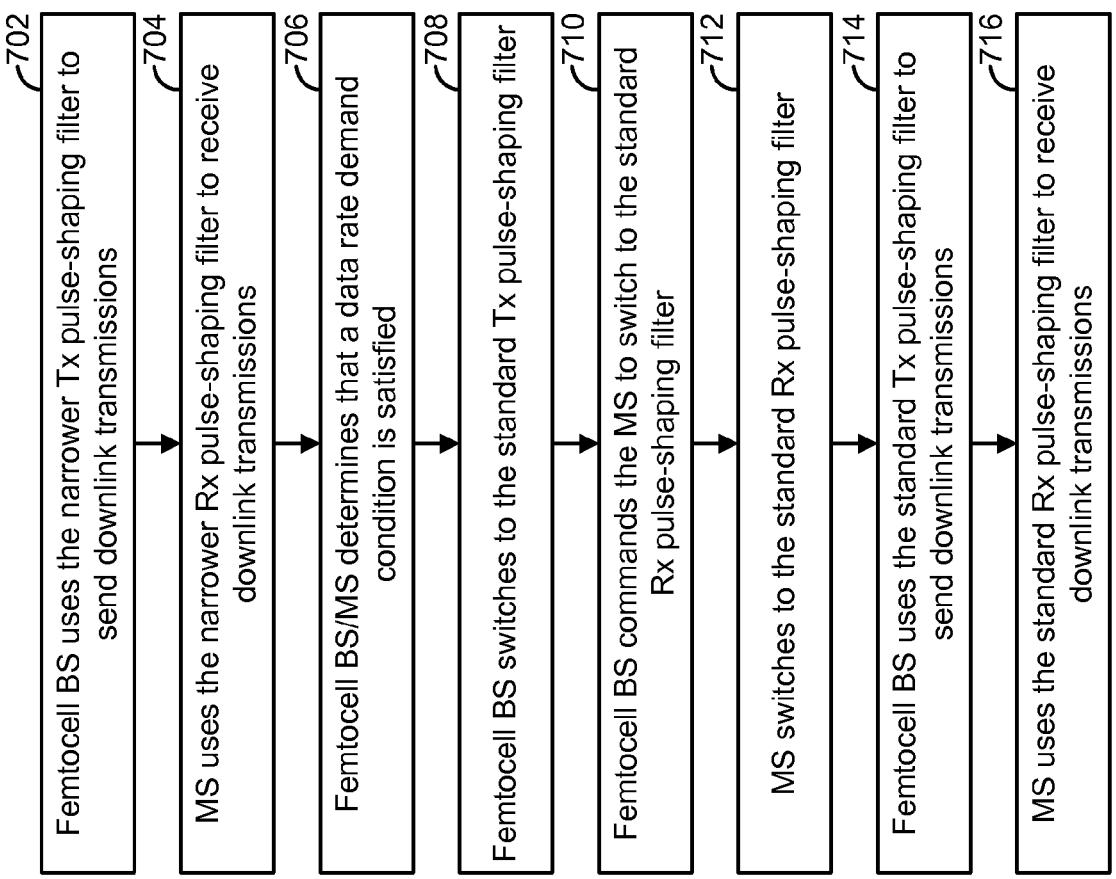
FIG. 7 illustrates a method for limiting adjacent channel interference.

FIG. 7 illustrates a method 700 for limiting adjacent channel interference. Suppose that the femtocell BS 610 is using 702 the narrower Tx pulse-shaping filter 650a to send transmissions on the downlink 614, and that the MS 606 is using 704 the narrower Rx pulse-shaping filter 652b to receive transmissions on the downlink 614.

At some point, the femtocell BS 610 and/or the MS 606 determines 706 that a condition that is related to the data rate demand by the MS 606 is satisfied. For example, suppose that the MS 606 is in the middle of downloading a large file. The femtocell BS 610 and/or the MS 606 may determine that the data rate of the download is not being limited by the connection between the femtocell BS 610 and the core network 216 via the wide area network 218 (e.g., the backhaul on the DSL or cable is not the limitation).

In response to making this determination 706, the femtocell BS 610 may switch 708 from using the narrower Tx pulse-shaping filter 650a to using the standard Tx pulse-shaping filter 626a. The use of the standard Tx pulse-shaping filter 626a may facilitate higher data rates on the downlink 614. The femtocell BS 610 may also provide 710 commands to the MS 606 to switch from using the narrower Rx pulse-shaping filter 652b to using the standard Rx pulse-shaping filter 646b. In response, the MS 606 may switch 712 from using the narrower Rx pulse-shaping filter 652b to using the standard Rx pulse-shaping filter 646b. The femtocell BS 610 may then use 714 the standard Tx pulse-shaping filter 626a to send transmissions on the downlink 614, and the MS 606 may then use 716 the standard Rx pulse-shaping filter 646b to receive transmissions on the downlink 614.

Figure 7A:
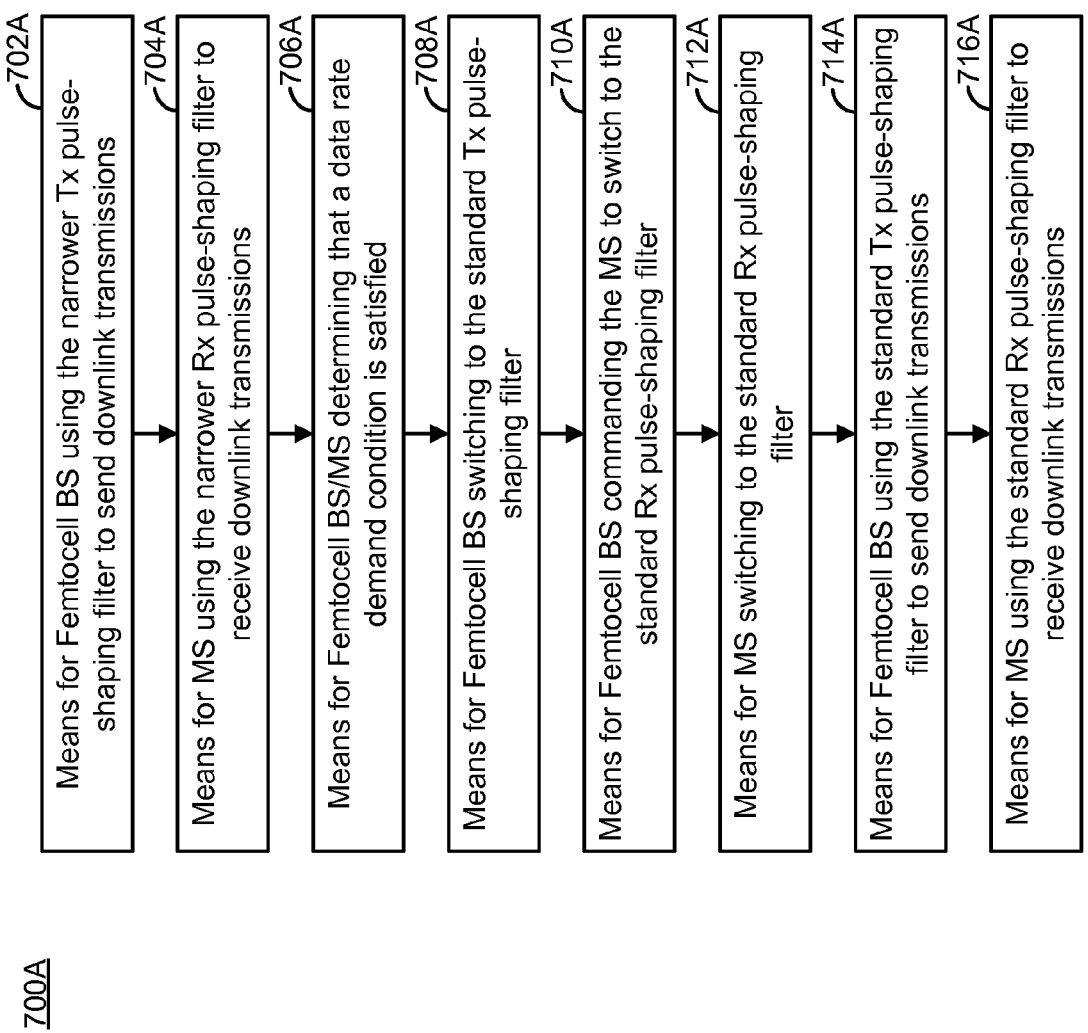
FIG. 7A illustrates means-plus-function blocks corresponding to the method of FIG. 7.

The method 700 of FIG. 7 described above may be performed by various hardware and/or software component(s) and/or module(s) corresponding to the means-plus-function blocks 700A illustrated in FIG. 7A. In other words, blocks 702 through 716 illustrated in FIG. 7 correspond to means-plus-function blocks 702A through 716A illustrated in FIG. 7A.

Figure 8:
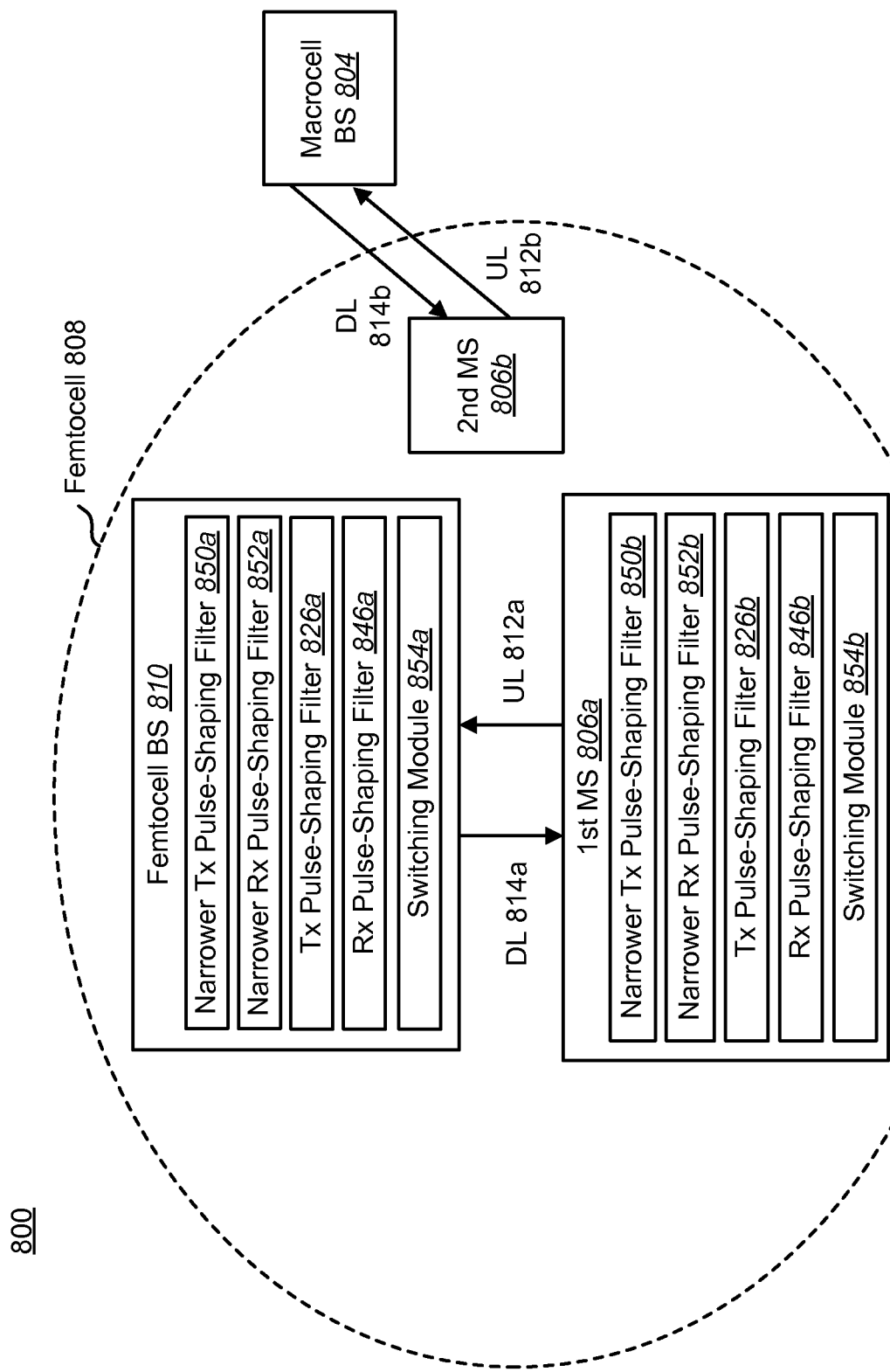
FIG. 8 illustrates another wireless communication system that is configured for limiting adjacent channel interference.

FIG. 8 illustrates another wireless communication system 800 that is configured for limiting adjacent channel interference. A first MS 806a is located within a femtocell 808. The first MS 806a is receiving service from the femtocell BS 810. Transmissions from the first MS 806a to the femtocell BS 810 occur via an uplink 812a, and transmissions from the femtocell BS 810 to the first MS 806a occur via a downlink 814a.

A second MS 806b is receiving service from a macrocell BS 804. Transmissions from the second MS 806b to the macrocell BS 804 occur via an uplink 812b, and transmissions from the macrocell BS 804 to the second MS 806b occur via a downlink 814b.

Figure 9:
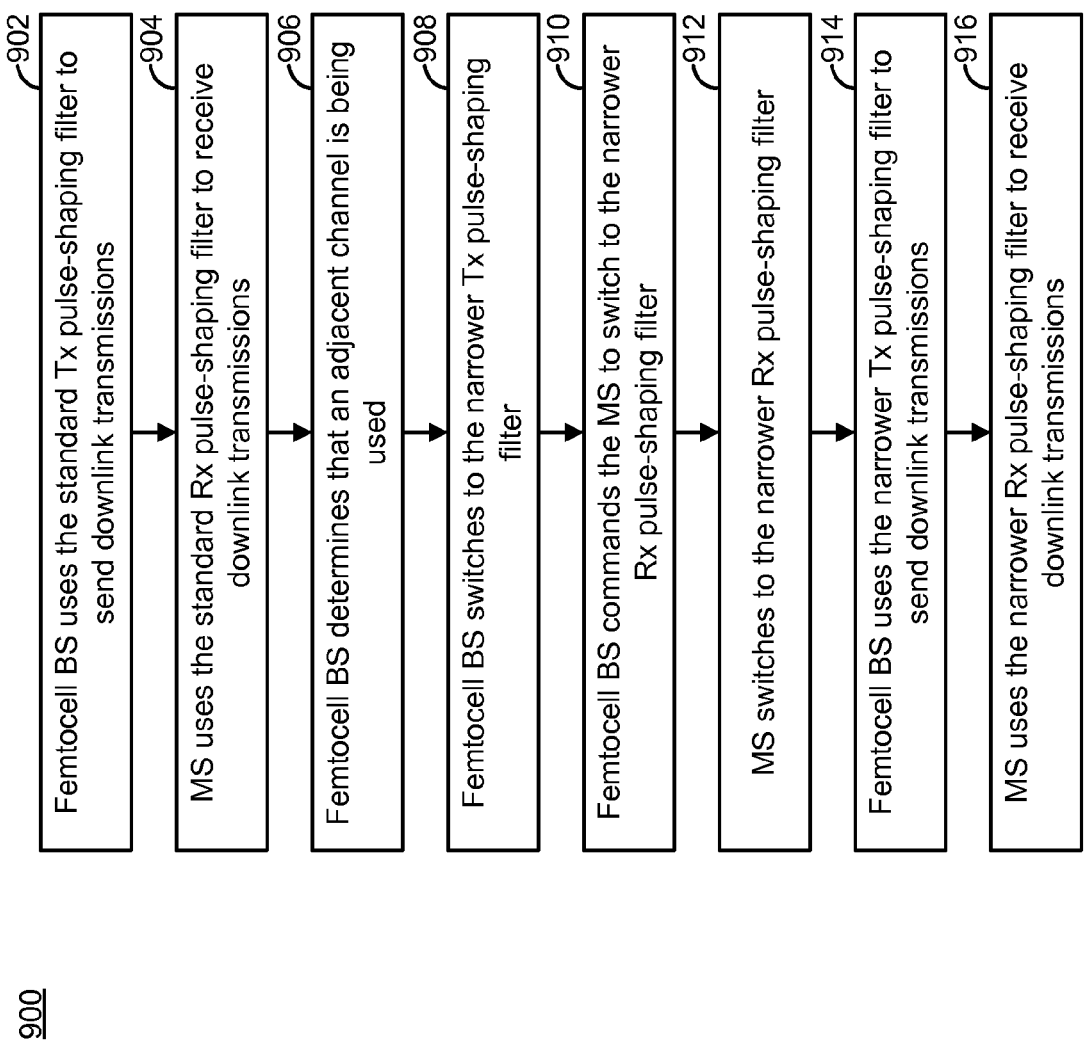
FIG. 9 illustrates another method for limiting adjacent channel interference.

FIG. 9 illustrates another method 900 for limiting adjacent channel interference. Suppose that the femtocell BS 810 is using 902 the standard Tx pulse-shaping filter 826a to send transmissions on the downlink 814a, and that the first MS 806a is using 904 the standard Rx pulse-shaping filter 846b to receive transmissions on the downlink 814a. At some point, the femtocell BS 810 determines 906 that an adjacent channel is being used, i.e., that one of the channels that is being used on the downlink 814a from the femtocell BS 810 to the first MS 806a is adjacent to one of the channels that is being used on the downlink 814b from the macrocell BS 804 to the second MS 806b. Thus, transmissions from the femtocell BS 810 to the first MS 806a on the downlink 814a may be received at the second MS 806b and may interfere with transmissions from the macrocell BS 804 to the second MS 806b on the downlink 814b.

In response to making this determination 906, the switching module 854a at the femtocell BS 810 may switch 908 from using the standard Tx pulse-shaping filter 826a to using the narrower Tx pulse-shaping filter 850a. The femtocell BS 810 may also provide 910 commands to the first MS 806a to switch from using the standard Rx pulse-shaping filter 846b to using the narrower Rx pulse-shaping filter 852b. In response, the switching module 854b at the first MS 806a may switch 912 from using the standard Rx pulse-shaping filter 846b to using the narrower Rx pulse-shaping filter 852b. The femtocell BS 810 may then use 914 the narrower Tx pulse-shaping filter 850a to send transmissions on the downlink 814a, and the first MS 806a may then use 916 the narrower Rx pulse-shaping filter 852b to receive transmissions on the downlink 814a.

Figure 9A:
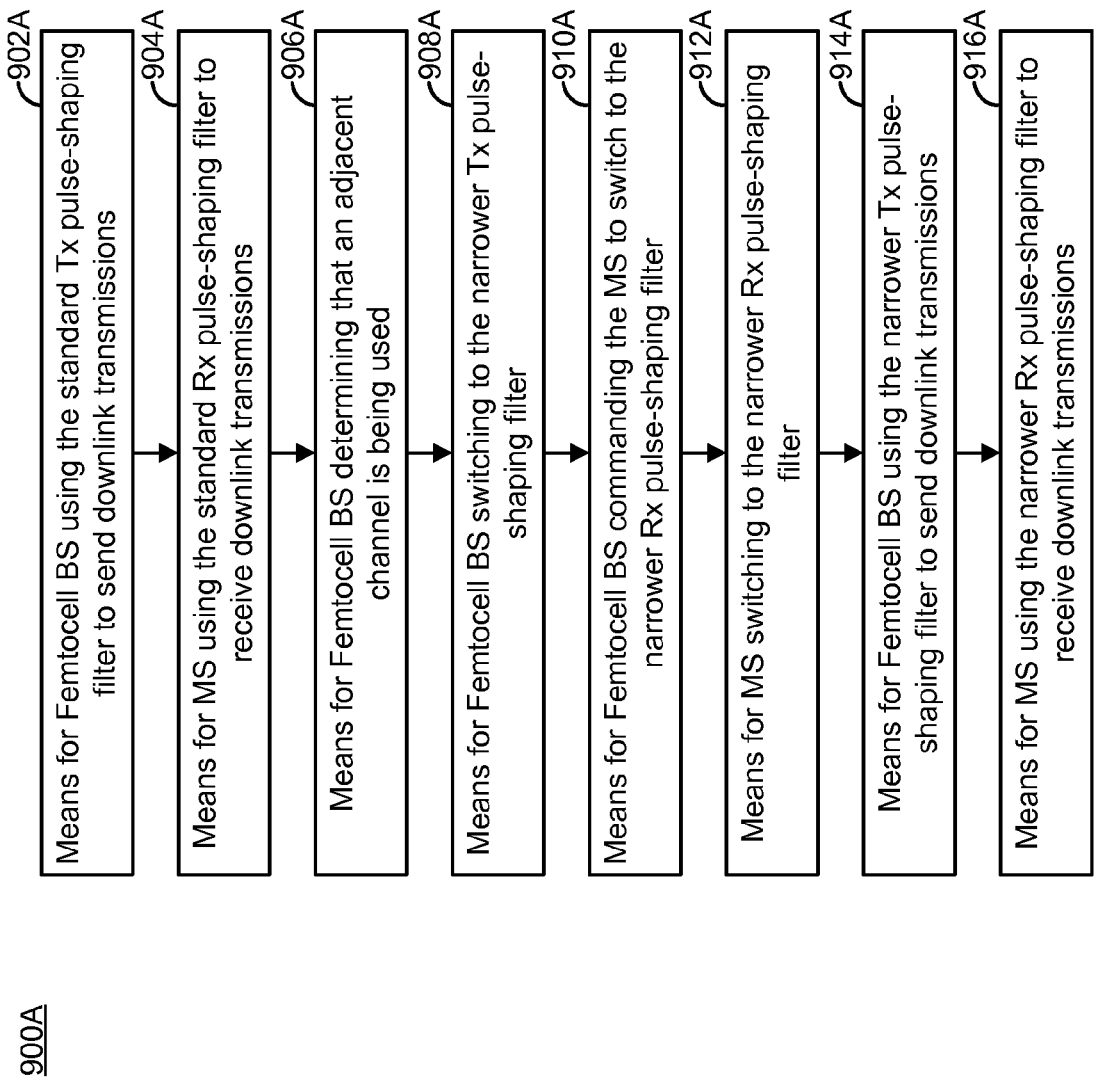
FIG. 9A illustrates means-plus-function blocks corresponding to the method of FIG. 9.

The method 900 of FIG. 9 described above may be performed by various hardware and/or software component(s) and/or module(s) corresponding to the means-plus-function blocks 900A illustrated in FIG. 9A. In other words, blocks 902 through 916 illustrated in FIG. 9 correspond to means-plus-function blocks 902A through 916A illustrated in FIG. 9A.

The bandwidth of the narrower Tx pulse-shaping filter 850a at the femtocell BS 810 may be varied depending on how close together the potentially interfering channels are. For example, consider the following two scenarios. In a first scenario, one of the channels that is being used on the downlink 814a from the femtocell BS 810 to the first MS 806a is adjacent to one of the channels that is being used on the downlink 814b from the macrocell BS 804 to the second MS 806b. In a second scenario, one of the channels that is being used on the downlink 814a is close to, but not adjacent to, one of the channels that is being used on the downlink 814b (e.g., it is two or three channels away). In some implementations, the bandwidth of the narrower Tx pulse-shaping filter 850a may be made more narrow in the first scenario than in the second scenario. Thus, the bandwidth of the narrower Tx pulse-shaping filter 850a may be adaptive.

FIG. 10 illustrates another method 1000 for limiting adjacent channel interference. When the femtocell BS 810 switches 1002 from using the standard Tx pulse-shaping filter 826a to using the narrower Tx pulse-shaping filter 850a, the femtocell BS 810 may determine 1004 the amount of interference that is occurring with adjacent (or nearly adjacent)

downlink channels (e.g., with one or more of the channels being used on the downlink 814b from the macrocell BS 804 to the second MS 806b). The femtocell BS 810 may then adjust 1006 the bandwidth of the narrower Tx pulse-shaping filter 850b based on the amount of interference that is occurring. If there is a significant amount of interference, then the narrower Tx pulse-shaping filter 850a may be made more narrow than if there is not a significant amount of interference.

It has been described how the bandwidth of the narrower Tx pulse-shaping filter 850a on the femtocell BS 810 may be varied depending on how close together the potentially interfering channels are. The bandwidth of the narrower Tx pulse-shaping filter 850b on the first MS 806a may be varied in an analogous manner.

The method 1000 of FIG. 10 described above may be performed by various hardware and/or software component(s) and/or module(s) corresponding to the means-plus-function blocks 1000A illustrated in FIG. 10A. In other words, blocks 1002 through 1006 illustrated in FIG. 10 correspond to means-plus-function blocks 1002A through 1006A illustrated in FIG. 10A.

Figure 11:
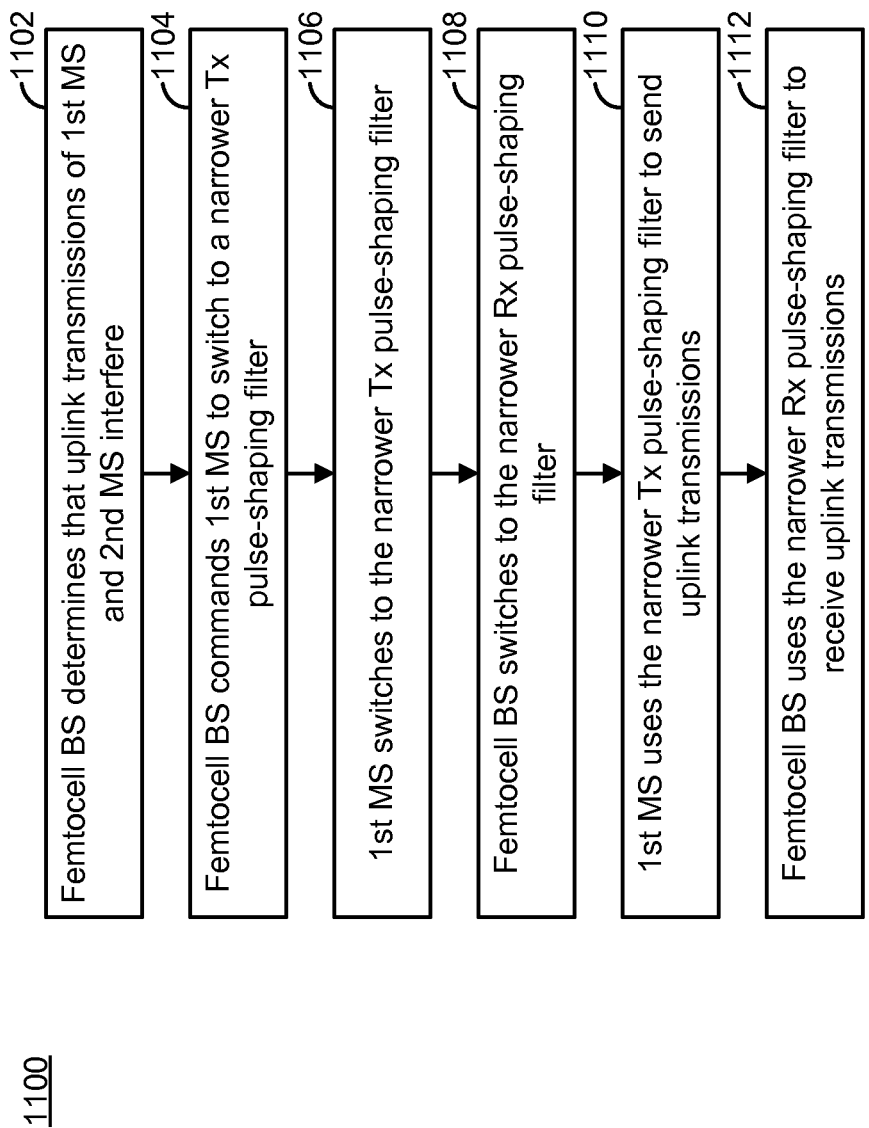
FIG. 11 illustrates another method for limiting adjacent channel interference.

FIG. 11 illustrates another method 1100 for limiting adjacent channel interference. The method 1100 may begin when the femtocell BS 810 determines 1102 that transmissions of the first MS 806a on the uplink 812a are interfering with transmissions of the second MS 806b on the uplink 812b. In response to making this determination, the femtocell BS 810 may provide 1104 commands to the first MS 806a to switch to the narrower Tx pulse-shaping filter 850b. In response to receiving these commands from the femtocell BS 810, the first MS 806a may switch 1106 to the narrower Tx pulse-shaping filter 850b. The femtocell BS 810 may switch 1108 to the narrower Rx pulse-shaping filter 852a. The first MS 806a may use 1110 the narrower Tx pulse-shaping filter 850a to send transmissions on the uplink 812a, and the femtocell BS 810 may use 1112 the narrower Rx pulse-shaping filter 852a to receive transmissions on the uplink 812a.

Figure 11A:
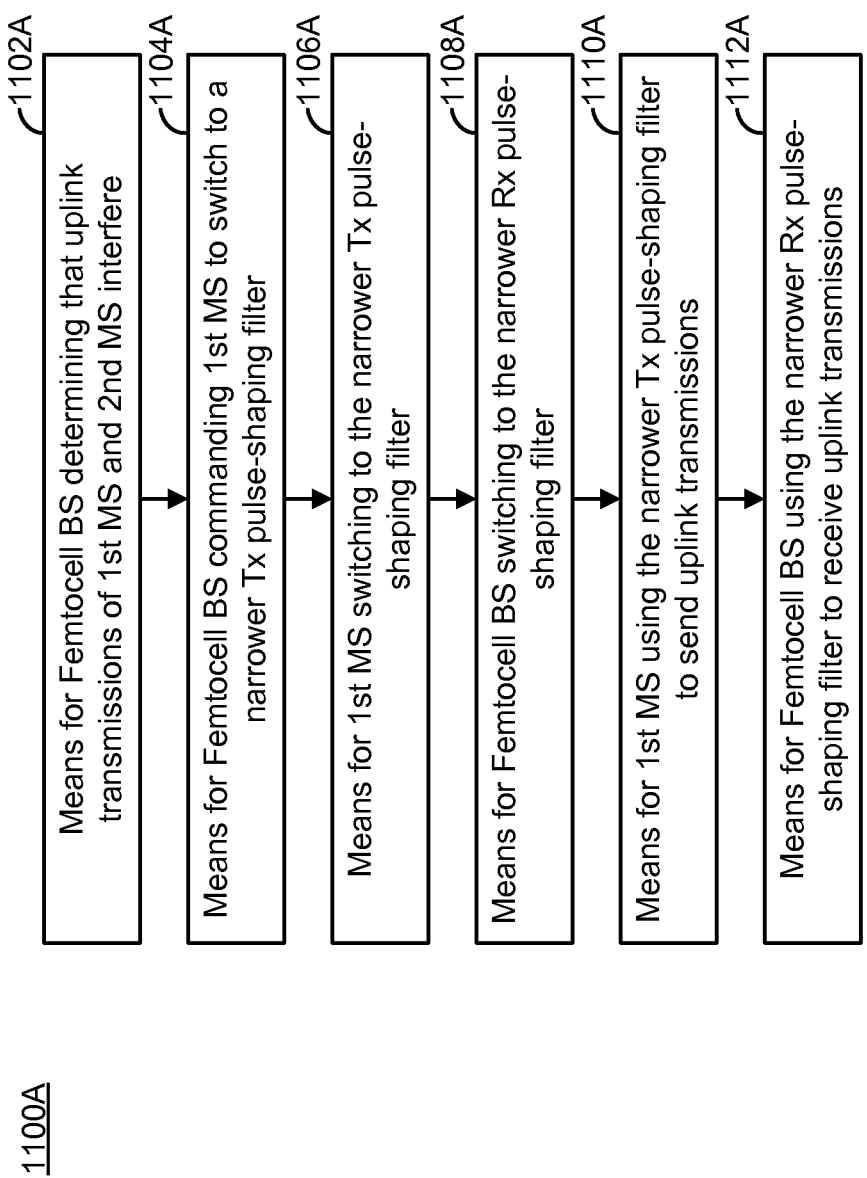
FIG. 11A illustrates means-plus-function blocks corresponding to the method of FIG. 11.

The method 1100 of FIG. 11 described above may be performed by various hardware and/or software component(s) and/or module(s) corresponding to the means-plus-function blocks 1100A illustrated in FIG. 11A. In other words, blocks 1102 through 1112 illustrated in FIG. 11 correspond to means-plus-function blocks 1102A through 1112A illustrated in FIG. 11A.

Figure 12:
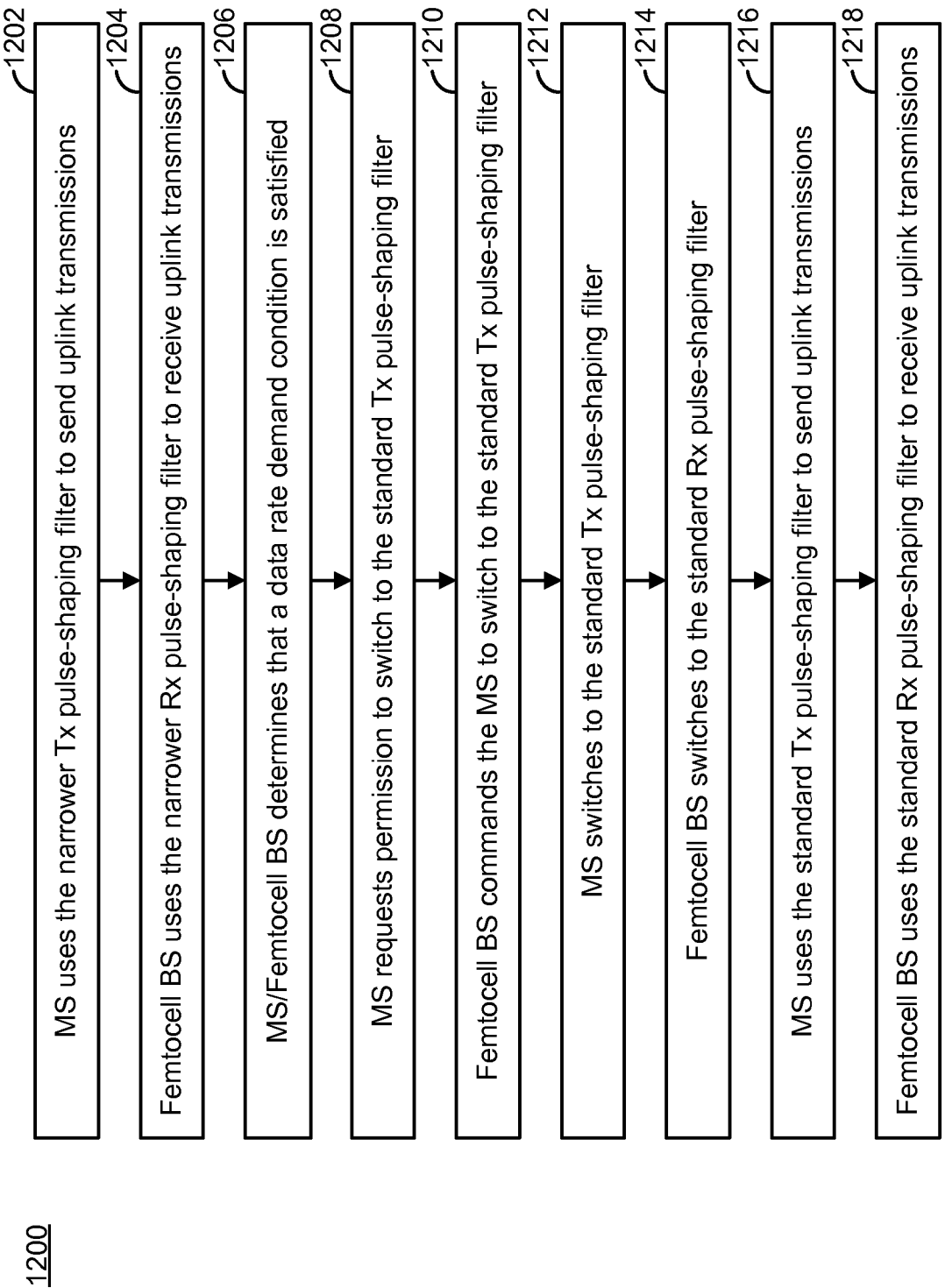
FIG. 12 illustrates another method for limiting adjacent channel interference.

FIG. 12 illustrates another method 1200 for limiting adjacent channel interference. The method 1200 may begin when the MS 806a is using 1202 the narrower Tx pulse-shaping filter 850b to send transmissions on the uplink 812a, and the femtocell BS 810 is using 1204 the narrower Rx pulse-shaping filter 852a to receive transmissions on the uplink 812a.

At some point, the MS 806a and/or the femtocell BS 810 may determine 1206 that a condition that is related to the data rate demand by the MS 806a is satisfied. For example, suppose that there is a lot of data to be sent on the uplink 812a, e.g., the MS 806a is in the middle of uploading a large file. The MS 806a and/or the femtocell BS 810 may determine that the data rate of the upload is not being limited by the connection between the femtocell BS 810 and the core network 216 via the wide area network 218.

In response to making this determination 1206, the MS 806a may request 1208 permission from the femtocell BS 810 to switch to the standard Tx pulse-shaping filter 826b. The femtocell BS 810 may determine whether it would be permissible for the MS 806a to switch to the standard Tx pulse-shaping filter 826b (e.g., whether having the MS 806a use the standard Tx pulse-shaping filter 826b would cause too much interference in the system 800). If so, the femtocell BS 810 may then provide 1210 commands to the MS 806a to switch to the standard Tx pulse-shaping filter 826b. In response to receiving these commands from the femtocell BS 810, the MS 806a may switch 1212 to the standard Tx pulse-shaping filter 826b. Alternatively, the MS 806a may switch 1212 to the standard Tx pulse-shaping filter 826b without first requesting permission from the femtocell BS 810.

When the MS 806a switches 1212 to the standard Tx pulse-shaping filter 826b, the femtocell BS 810 may switch 1214 to the standard Rx pulse-shaping filter 846a. The MS 806a may use 1216 the standard Tx pulse-shaping filter 826b to send transmissions on the uplink 812a, and the femtocell BS 810 may use 1218 the standard Rx pulse-shaping filter 846a to receive transmissions on the uplink 812a.

Figure 12A:
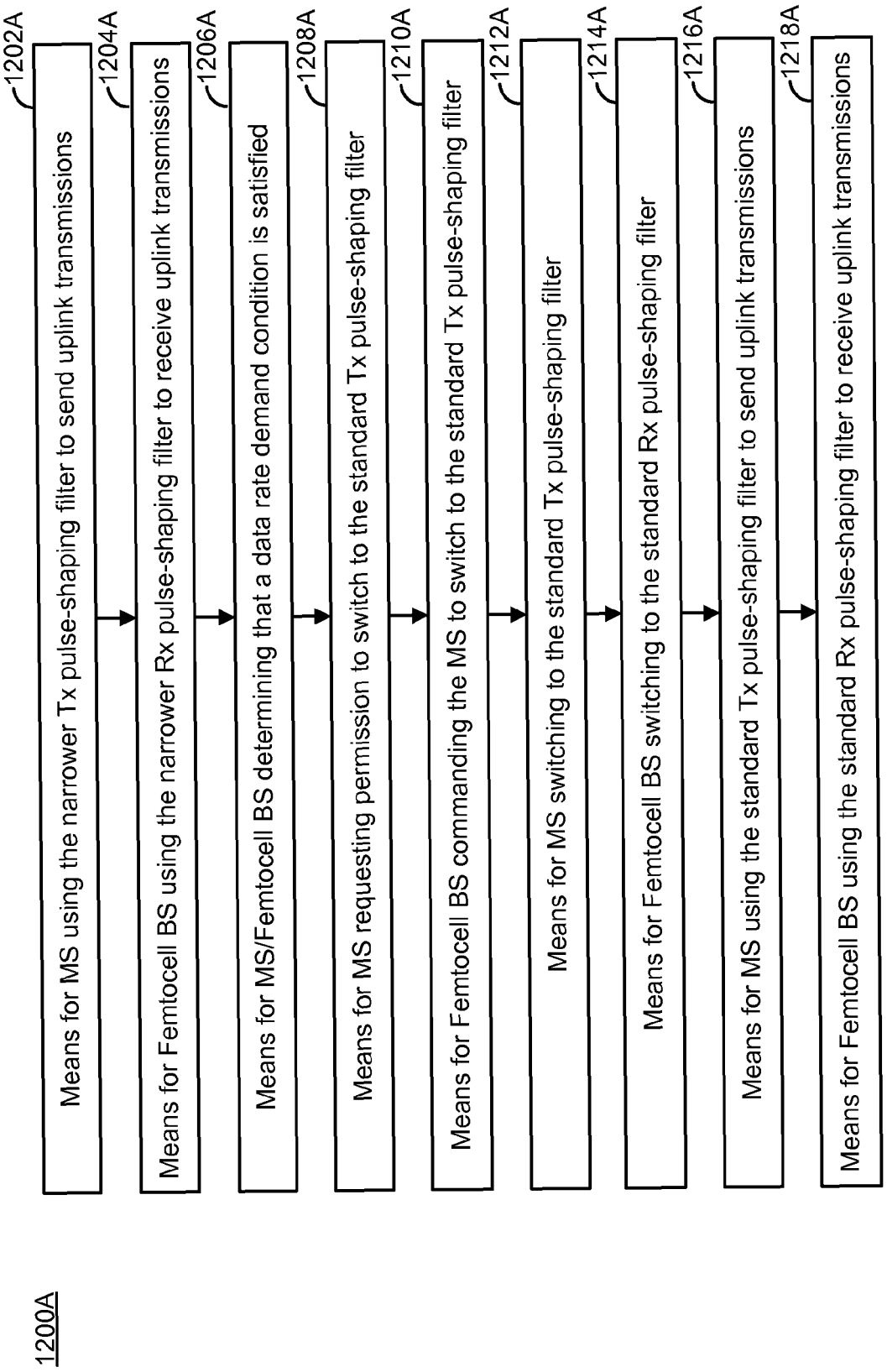
FIG. 12A illustrates means-plus-function blocks corresponding to the method of FIG. 12.

The method 1200 of FIG. 12 described above may be performed by various hardware and/or software component(s) and/or module(s) corresponding to the means-plus-function blocks 1200A illustrated in FIG. 12A. In other words, blocks 1202 through 1218 illustrated in FIG. 12 correspond to means-plus-function blocks 1202A through 1218A illustrated in FIG. 12A.

Figure 13:
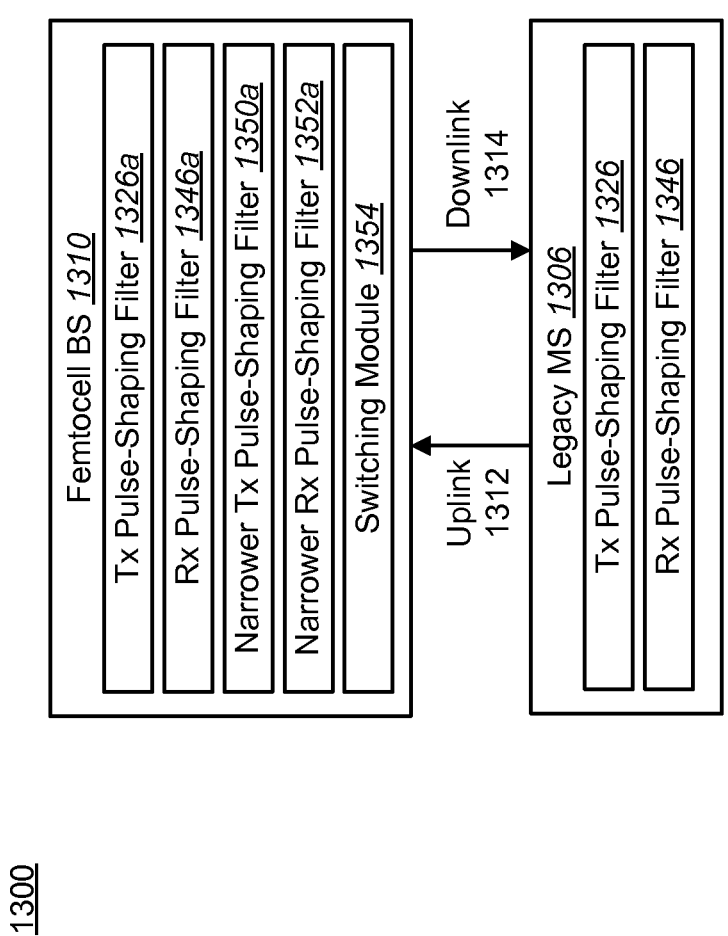
FIG. 13 illustrates another wireless communication system that is configured for limiting adjacent channel interference.

FIG. 13 illustrates another wireless communication system 1300 that is configured for limiting adjacent channel interference. A femtocell BS 1310 is providing service to a legacy MS 1306. The legacy MS 1306 includes a standard Tx pulse-shaping filter 1326 and a standard Rx pulse-shaping filter 1346. However, the legacy MS 1306 does not include either a narrower Tx pulse-shaping filter or a narrower Rx pulse-shaping filter. The femtocell BS 1310 detects that the MS 1306 is a legacy MS 1306, i.e., that the MS 1306 does not include either a narrower Tx pulse-shaping filter or a narrower Rx pulse-shaping filter. In response, the femtocell BS 1310 may use the standard Tx pulse-shaping filter 1326a to send transmissions on the downlink 1314. Also, the femtocell BS 1310 uses the standard Rx pulse-shaping filter 1346a to receive transmissions on the uplink 1312. If the femtocell BS 1310 is using the narrower Tx pulse-shaping filter 1350a and the narrower Rx pulse-shaping filter 1352a when it detects that the MS 1306 is a legacy MS 1306, then the switching module 1354 at the femtocell BS 1310 may switch to the standard Tx pulse-shaping filter 1326a and the standard Rx pulse-shaping filter 1346a.

Alternatively, the femtocell BS 1310 may still choose to use the narrower Tx pulse-shaping filter 1350a under certain circumstances (e.g., if the amount of adjacent channel interference is a significant concern). The legacy MS 1306 should still be able to receive the downlink 1314 transmissions from the femtocell BS 1310, even though the filters would not be matched in this situation.

Figure 14:
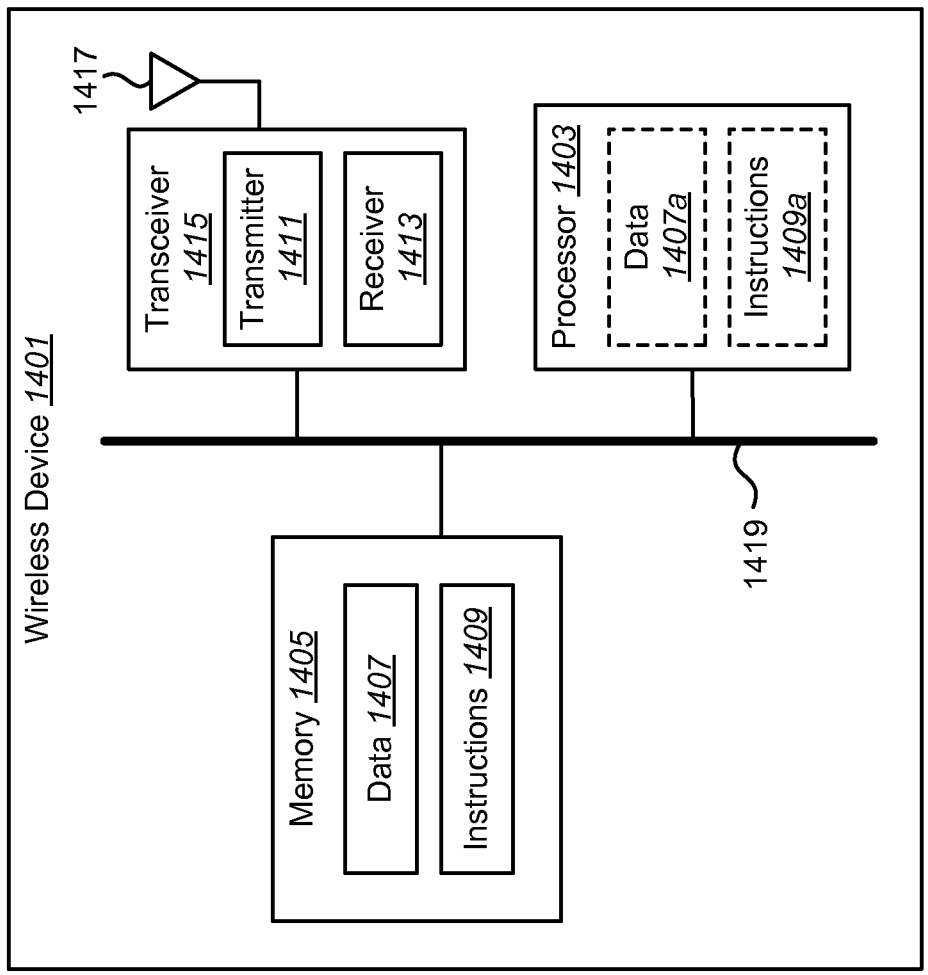
FIG. 14 illustrates certain components that may be included within a wireless device.

FIG. 14 illustrates certain components that may be included within a wireless device 1401. The wireless device 1401 may be a mobile station or a base station.

The wireless device 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless device 1401 of FIG. 14, in an alternative configuration, a combination of processors (e.g., an ARM and DSP) could be used.

The wireless device 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405. A certain amount of data 1407a and instructions 1409a may be loaded into the processor 1403.

The wireless device 1401 may also include a transmitter 1411 and a receiver 1413 to allow transmission and reception of signals between the wireless device 1401 and a remote location. The transmitter 1411 and receiver 1413 may be collectively referred to as a transceiver 1415.

An antenna 1417 may be electrically coupled to the transceiver 1415. The wireless device 1401 may also include (not shown) multiple transmitters, multiple receivers, multiple transceivers and/or multiple antenna.

The various components of the wireless device 1401 may be coupled together by one or more buses, which may include a power bus, a control signal bus, a status signal bus, a data bus, etc. For the sake of clarity, the various buses are illustrated in FIG. 14 as a bus system 1419.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 7, 9, and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A femtocell base station that is configured for limiting adjacent channel interference, comprising:
   a transmitter that is configured to transmit downlink signals to a mobile station;
   a transmit pulse-shaping filter that limits bandwidth of the downlink signals transmitted by the femtocell base station;
   a narrower transmit pulse-shaping filter that limits the bandwidth of the downlink signals transmitted by the femtocell station to a greater extent than the transmit pulse-shaping filter;
   a processor;
   memory in electronic communication with the processor; and
   instructions stored in the memory, the instructions being executable by the processor to cause the femtocell base station to switch between the transmit pulse-shaping filter and the narrower transmit pulse-shaping filter.

2. The femtocell base station of claim 1, wherein the instructions are executable by the processor to cause the femtocell base station to switch from the transmit pulse-shaping filter to the narrower transmit pulse-shaping filter in response to determining that an adjacent channel is being used.

3. The femtocell base station of claim 1, wherein the instructions are executable by the processor to cause the femtocell base station to switch from the transmit pulse-shaping filter to the narrower transmit pulse-shaping filter in response to detecting that downlink transmissions of the femtocell base station to a first mobile station interfere with downlink transmissions from a macrocell base station to a second mobile station operating on an adjacent channel.

4. The femtocell base station of claim 2, wherein the bandwidth of the narrower transmit pulse-shaping filter depends on the amount of interference that is occurring.

5. The femtocell base station of claim 1, wherein the instructions are executable by the processor to cause the femtocell base station to switch from the transmit pulse-shaping filter to the narrower transmit pulse-shaping filter in response to determining that the femtocell base station is not currently providing service to any mobile stations.

6. The femtocell base station of claim 1, wherein the instructions are executable by the processor to cause the femtocell base station to switch from the narrower transmit puke-shaping filter to the transmit pulse-shaping filter in response to determining that a data rate condition is satisfied.

7. The femtocell base station of claim 1, wherein the instructions are executable by the processor to cause the femtocell base station to determine whether to use the transmit pulse-shaping filter or the narrower transmit pulse-shaping filter in response to detecting that the mobile station is a legacy mobile station.

8. The femtocell base station of claim 1, wherein the instructions are executable by the processor to cause the femtocell base station to provide at least one command to the mobile station about which receive pulse-shaping filter to use based on whether the transmit pulse-shaping filter or the narrower transmit pulse-shaping filter is being used at the femtocell base station.

9. The femtocell base station of claim 1, further comprising:
  a receiver for receiving uplink signals from the mobile station;
  a receive pulse-shaping filter that matches a transmit pulse-shaping fitter at the mobile station; and
  a narrower receive pulse-shaping filter that matches a narrower transmit pulse-shaping filter at the mobile station;
  wherein the instructions are executable by the processor to cause the femtocell base station to switch between the receive pulse-shaping filter and the narrower receive pulse-shaping filter.

10. The femtocell base station of claim 9, wherein the instructions are executable by the processor to cause the femtocell base station to switch between the receive pulse-shaping filter and the narrower receive pulse-shaping filter based on at least one command received from the mobile station.

11. The femtocell base station of claim 1, wherein the instructions are executable by the processor to cause the femtocell base station to provide at least one command to the mobile station to switch to a narrower transmit pulse-shaping filter in response to detecting that uplink transmissions of the mobile station interfere with uplink transmissions of another mobile station operating on an adjacent channel.

12. The femtocell base station of claim 1, wherein the instructions are executable by the processor to cause the femtocell base station to provide at least one command to the mobile station to switch from the narrower transmit pulse-shaping filter to the transmit pulse-shaping filter in response to a data rate condition being satisfied.

13. A method for limiting adjacent channel interference, the method being implemented by a femtocell base station, the method comprising:
  transmitting downlink signals to a mobile station; and
  switching between a transmit pulse-shaping filter and a narrower transmit pulse-shaping filter;
  wherein the transmit pulse-shaping filter limits bandwidth of the downlink signals transmitted by the femtocell base station, and wherein the narrower transmit pulse-shaping filter limits the bandwidth of the downlink signals transmitted by the femtocell station to a greater extent than the transmit pulse-shaping filter.

14. The method of claim 13, wherein the switching comprises switching from the transmit pulse-shaping filter to the narrower transmit pulse-shaping filter in response to determining that an adjacent channel is being used.

15. The method of claim 13, wherein the switching comprises switching from the transmit pulse-shaping filter to the narrower transmit pulse-shaping filter in response to detecting that downlink transmissions of the femtocell base station to a first mobile station interfere with downlink transmissions from a macrocell base station to a second mobile station operating on an adjacent channel.

16. The method of claim 14, wherein the bandwidth of the narrower transmit pulse-shaping filter depends on the amount of interference that is occurring.

17. The method of claim 13, wherein the switching comprises switching from the transmit pulse-shaping filter to the narrower transmit pulse-shaping filter in response to determining that the femtocell base station is not currently providing service to any mobile stations.

18. The method of claim 13, wherein the switching comprises switching from the narrower transmit puke-shaping filter to the transmit pulse-shaping filter in response to determining that a data rate condition is satisfied.

19. The method of claim 13, further comprising determining whether to use the transmit pulse-shaping filter or the narrower transmit pulse-shaping filter in response to detecting that the mobile station is a legacy mobile station.

20. The method of claim 13, further comprising providing at least one command to the mobile station about which receive pulse-shaping filter to use based on whether the transmit pulse-shaping filter or the narrower transmit pulse-shaping filter is being used at the femtocell base station.

21. The method of claim 13, further comprising:
  receiving uplink signals from the mobile station; and
  switching between a receive pulse-shaping filter and a narrower receive pulse-shaping filter;
  wherein the receive pulse-shaping filter matches a transmit pulse-shaping filter at the mobile station, and wherein the narrower receive pulse-shaping filter matches a narrower transmit pulse-shaping filter at the mobile station.

22. The method of claim 21, wherein the switching comprises switching between the receive pulse-shaping filter and the narrower receive pulse-shaping filter based on commands received from the mobile station.

23. The method of claim 13, further comprising providing at least one command to the mobile station to switch to a narrower transmit pulse-shaping filter in response to detecting that uplink transmissions of the mobile station interfere with uplink transmissions of another mobile station on an adjacent channel.

24. The method of claim 13, further comprising providing at least one command to the mobile station to switch from the narrower transmit pulse-shaping filter to the transmit pulse-shaping filter in response to a data rate condition being satisfied.

25. A femtocell base station that is configured for limiting adjacent channel interference, comprising:
   means for transmitting downlink signals to a mobile station; and
   means for switching between a transmit pulse-shaping filter and a narrower transmit pulse-shaping filter;
   wherein the transmit pulse-shaping filter limits bandwidth of the downlink signals transmitted by the femtocell base station, and wherein the narrower transmit pulse-shaping filter limits the bandwidth of the downlink signals transmitted by the femtocell station to a greater extent than the transmit pulse-shaping filter.

26. The femtocell base station of claim 25, wherein the means for switching comprises means for switching from the transmit pulse-shaping filter to the narrower transmit pulse-shaping filter in response to determining that an adjacent channel is being used.

27. The femtocell base station of claim 26, wherein the bandwidth of the narrower transmit pulse-shaping filter depends on the amount of interference that is occurring.

28. The femtocell base station of claim 25, wherein the means for switching comprises means for switching from the transmit pulse-shaping filter to the narrower transmit pulse-shaping filter in response to determining that the femtocell base station is not currently providing service to any mobile stations.

29. The femtocell base station of claim 25, wherein the means for switching comprises means for switching from the narrower transmit pulse-shaping filter to the transmit pulse-shaping filter in response to determining that a data rate condition is satisfied.

30. The femtocell base station of claim 25, further comprising means for determining whether to use the transmit pulse-shaping filter or the narrower transmit pulse-shaping filter in response to detecting that the mobile station is a legacy mobile station.

31. The femtocell base station of claim 25, further comprising means for providing at least one command to the mobile station about which receive pulse-shaping filter to use based on whether the transmit pulse-shaping filter or the narrower transmit pulse-shaping, filter is being used at the femtocell base station.

32. The femtocell base station of claim 25, further comprising:
   means for receiving uplink signals from the mobile station; and
   means for switching between a receive pulse-shaping filter and a narrower receive pulse-shaping filter;
   wherein the receive pulse-shaping tiller matches a transmit pulse-shaping filter at the mobile station, and wherein the narrower receive pulse-shaping filter matches a narrower transmit pulse-shaping filter at the mobile station.

33. The femtocell base station of claim 32, wherein the means for switching comprises means for switching between the receive pulse-shaping filter and the narrower receive pulse-shaping filter based on at least one command received from the mobile station.

34. A computer-program product for a femtocell base station that is configured to limit adjacent channel interference, the computer-program product comprising a non-transitory computer-readable medium having instructions thereon, the instructions comprising:
   code for transmitting downlink signals to a mobile station; and
   code for switching between a transmit pulse-shaping filter and a narrower transmit pulse-shaping filter;
   wherein the transmit pulse-shaping filter limits bandwidth of the downlink signals transmitted by the femtocell base station, and wherein the narrower transmit pulse-shaping filter limits the bandwidth of the downlink signals transmitted by the femtocell station to a greater extent than the transmit pulse-shaping filter.

35. The computer-program product of claim 34, wherein the code for switching comprises at least one of:
   code for switching from the transmit pulse-shaping filter to the narrower transmit pulse-shaping filter in response to determining that an adjacent channel is being used;
   code for switching from the transmit pulse-shaping filter to the narrower transmit pulse-shaping filter in response to determining that the femtocell base station is not currently providing service to any mobile stations;
   code for switching from the narrower transmit pulse-shaping filter to the transmit pulse-shaping filter in response to determining that a data rate condition is satisfied; and
   code for switching from the transmit pulse-shaping filter to the narrower transmit pulse-shaping filter in response to determining that downlink transmissions of the femtocell to a first mobile interfere with downlink transmissions from a macrocell to a second mobile operating on an adjacent channel;
   code for determining whether to use the transmit pulse-shaping filter or the narrower transmit pulse-shaping filter in response to detecting that the mobile station is a legacy mobile station.

36. The computer-program product of claim 34, further comprising:
   code for receiving uplink signals from the mobile station; and
   code for switching between a receive pulse-shaping filter and a narrower receive pulse-shaping filter;
   wherein the receive pulse-shaping filter matches a transmit pulse-shaping filter at the mobile station, and wherein the narrower receive pulse-shaping filter matches a narrower transmit pulse-shaping filter at the mobile station.

37. A mobile station that is configured for limiting adjacent channel interference, comprising:
   a transmitter that is configured to transmit uplink signals to a femtocell base station;
   a transmit pulse-shaping filter;
   a narrower transmit pulse-shaping filter, wherein the narrower transmit pulse-shaping filter limits bandwidth of uplink signals transmitted by the mobile station to a greater extent than the transmit pulse-shaping filter;
   a processor;
   memory in electronic communication with the processor; and
   instructions stored in the memory, the instructions being executable by the processor to cause the mobile station to switch between the transmit pulse-shaping filter and the narrower transmit pulse-shaping filter based on commands associated with another transmit pulse-shaping filter at the femtocell base station, the commands being received from the femtocell base station.

38. A mobile station that is configured for limiting adjacent channel interference, comprising:
   a transmitter that is configured to transmit uplink signals to a femtocell base station;
   a transmit pulse-shaping filter;
   a narrower transmit pulse-shaping filter, wherein the narrower transmit pulse-shaping filter limits bandwidth of uplink signals transmitted by the mobile station to a greater extent than the transmit pulse-shaping filter;
a processor;
memory in electronic communication with the processor; and
instructions stored in the memory, the instructions being executable by the processor to cause the mobile station to switch from the narrower transmit pulse-shaping filter to the transmit pulse-shaping filter in response to determining that a data rate condition is satisfied.

39. The mobile station of claim 38, wherein the instructions are also executable by the processor to cause the mobile station to request permission from the femtocell base station to switch from the narrower transmit pulse-shaping filter to the transmit pulse shaping filter in response to determining that the data rate condition is satisfied.

* * * * *